(12) United States Patent
Tsang et al.

(10) Patent No.: US 7,359,929 B2
(45) Date of Patent: Apr. 15, 2008

(54) FAST SOLUTION OF INTEGRAL EQUATIONS REPRESENTING WAVE PROPAGATION

(75) Inventors: Leung Tsang, Mercer Island, WA (US); Dong Chen, Shanghai (CN); Qin Li, Seattle, WA (US)

(73) Assignee: City University of Hong Kong, Hong Kong (CN)

( * ) Notice: Subject to any disclaimer, the term of this patent is extended or adjusted under 35 U.S.C. 154(b) by 652 days.

(21) Appl. No.: 10/706,605

(22) Filed: Nov. 12, 2003

(65) Prior Publication Data

US 2005/0102343 A1    May 12, 2005

(51) Int. Cl.
 *G06F 7/38* (2006.01)
(52) U.S. Cl. ..................................... 708/446
(58) Field of Classification Search .................. 708/446
 See application file for complete search history.

(56) References Cited

U.S. PATENT DOCUMENTS

| | | | |
|---|---|---|---|
| 4,936,610 A | 6/1990 | Kumar et al. | |
| 4,944,539 A | 7/1990 | Kumar et al. | |
| 5,548,798 A * | 8/1996 | King ........................... | 710/68 |
| 6,046,960 A | 4/2000 | Kumar | |
| 6,077,303 A | 6/2000 | Mandell et al. | |
| 6,169,965 B1 | 1/2001 | Kubisiak et al. | |
| 6,636,828 B1 * | 10/2003 | Hachiya ........................ | 703/2 |
| 6,668,062 B1 | 12/2003 | Luo et al. | |
| 6,694,343 B2 * | 2/2004 | Forrest et al. .............. | 708/520 |
| 2004/0015531 A1 * | 1/2004 | Walster et al. .............. | 708/446 |
| 2004/0148324 A1 * | 7/2004 | Garg ........................... | 708/446 |
| 2004/0181565 A1 * | 9/2004 | Ikeda .......................... | 708/446 |
| 2005/0015421 A1 * | 1/2005 | Fuller ......................... | 708/446 |
| 2005/0071404 A1 * | 3/2005 | Nutter et al. ............... | 708/446 |

* cited by examiner

*Primary Examiner*—Tan V. Mai
(74) *Attorney, Agent, or Firm*—Fredrikson & Byron, P.A.

(57) ABSTRACT

A technique for solving a set of wave equations in a region uses points arranged in a grid spanning the region or coefficients of wave expansion for objects located in the region. The grid points or the coefficients are partitioned into blocks on multiple levels, and block impedance matrices encoding the wave equations is derived for pairs of blocks. The block impedance matrix need not be calculated as it is written as the product of two non-square matrices, denoted U and V. Each of U and V have one linear dimension which is only of the order of the rank of the block impedance matrix levels. The rank is predetermined by coarse sampling. Two examples of the use of the invention are given: solving surface integral equations and Foldy Lax equations for partial waves.

33 Claims, 11 Drawing Sheets

(a) (b) (c)

(a)

| $57_1$ | $58_1$ | $59_1$ | $60_1$ | $61_1$ | $62_1$ | $63_1$ | $64_1$ |
|---|---|---|---|---|---|---|---|
| $49_1$ | $50_1$ | $51_1$ | $52_1$ | $53_1$ | $54_1$ | $55_1$ | $56_1$ |
| $41_1$ | $42_1$ | $43_1$ | $44_1$ | $45_1$ | $46_1$ | $47_1$ | $48_1$ |
| $33_1$ | $34_1$ | $35_1$ | $36_1$ | $37_1$ | $38_1$ | $39_1$ | $40_1$ |
| $25_1$ | $26_1$ | $27_1$ | $28_1$ | $29_1$ | $30_1$ | $31_1$ | $32_1$ |
| $17_1$ | $18_1$ | $19_1$ | $20_1$ | $21_1$ | $22_1$ | $23_1$ | $24_1$ |
| $9_1$ | $10_1$ | $11_1$ | $12_1$ | $13_1$ | $14_1$ | $15_1$ | $16_1$ |
| $1_1$ | $2_1$ | $3_1$ | $4_1$ | $5_1$ | $6_1$ | $7_1$ | $8_1$ |

(b)

| $13_2$ | $14_2$ | $15_2$ | $16_2$ |
|---|---|---|---|
| $9_2$ | $10_2$ | $11_2$ | $12_2$ |
| $5_2$ | $6_2$ | $7_2$ | $8_2$ |
| $1_2$ | $2_2$ | $3_2$ | $4_2$ |

| $n_i^{(3)}$ | $n_i^{(4)}$ |
|---|---|
| $n_i^{(1)}$ | $n_i^{(2)}$ |

$m_{(i+1)}$

| $m_i^{(3)}$ | $m_i^{(4)}$ |
|---|---|
| $m_i^{(1)}$ | $m_i^{(2)}$ |

(a)

$n_{(i+1)}$      $m_{(i+1)}$

| $n_i^{(3)}$ | $n_i^{(4)}$ | $m_i^{(3)}$ | $m_i^{(4)}$ |
|---|---|---|---|
| $n_i^{(1)}$ | $n_i^{(2)}$ | $m_i^{(1)}$ | $m_i^{(2)}$ |

FAST SOLUTION OF INTEGRAL EQUATIONS REPRESENTING WAVE PROPAGATION

FIELD OF THE INVENTION

The present invention relates to methods, apparatus and software products for solving integral equations representing wave propagation, and in particular scattering of waves. In some applications of the method the integral equations are solved in order to analyze a complex printed circuit board (PCB), Integrated Circuit (IC) packaging, high-performance interconnects, on-chip structures, patch antennas, or microstrip antennas. The methods can also be used to analyze photonic bandgap structures, meta-materials, the electronic scattering from nanostructures, the electronic bandstructures of nanomaterials and the effective electric and magnetic properties of composite materials.

BACKGROUND OF THE INVENTION

Integrated Circuits are the basic parts of most electronic systems such as computers, digital cameras, wireless communication systems, Internet devices, networking devices and systems, automotive electronic systems, control systems, and power electronics. An IC is an interconnected array of active and passive elements integrated with a single semiconductor substrate or deposited on the substrate by a continuous series of compatible processes, and capable of performing at least one complete electronic circuit function. ICs are usually hosted on a printed circuit board (PCB). A PCB is a flat board whose front contains slots for integrated circuit chips and connections for a variety of electronic components, and whose back is printed with electrically conductive pathways between the components.

With the rapid advance of current semiconductor technology, the size of the ICs has been very much reduced while the speed of the ICs has greatly increased. This leads to much higher data transmission rates, diminishing size of the electronic devices, and increase functionalities of the electronic products. These make the design of the electronic devices more difficult and increase the challenges in the analysis of power and signal integrity problem. Designers of electronic systems are increasingly dependent on software tools that can effectively overcome these technique difficulties. However, conventional signal-integrity analysis tools are circuit-based and lack the accuracy required for high-speed integrated circuit design. Wave solutions based on the Maxwell's equations are essential for the advanced analysis of printed circuit boards (PCBs), IC components, and packages, to address the rigorous demands of circuit design.

Electromagnetic problems are governed by Maxwell's equations, which can be formulated into the surface integral equations using a Green's function. Using the method of moments (MoM), the integral equation can be cast into the matrix equation. In a matrix equation, the product of the impedance matrix and an unknown column vector is equal to a given column vector. The given column vector corresponds to the given incident wave. The unknown column vector corresponds to the unknown induced current and charges. The objective is to solve for the unknown column vector. The Green's function integral equation approach has the advantage that it takes into account the propagation of waves from one point to another. It also has the advantage, for numerical solutions of the surface integral equation, that only surface unknowns are required on the object surface.

However, using Greens function leads to matrix equations with a full impedance matrix, which relates the source locations to the observation points through propagation. If there are N surface unknowns in the matrix equation, a traditional technique for solving the column vector of matrix equations, such as the matrix inversion method, Gaussian elimination method or the LU decomposition method, takes $O(N^3)$ computational steps and $O(N^2)$ of memory. Thus, the computation becomes resource intensive when N is large. For example, at present, using a single processor of 2.66 GHz, it requires CPU 15 minutes and Memory of 235 Mb to solve the case of N=5000. Assuming the scaling with N given above, for N=65000, the technique of matrix inversion will require 550 hours CPU and 39,715 Mb memory on a single processor. This is impossible for a single PC processor today. Thus matrix inversion cannot be used for such problems of large dense matrix.

Thus for such problems, a common methodology is to use an iterative method of solutions of the matrix equation. The iteration method means that we start with an initial guess of the column vector. In each iteration, the column vector for the matrix equation is solved by iteration of the previous column vector. Each iteration requires the product of the impedance matrix with the column vector of the previous step. This process continues until the column vector converges. Using the iterative approach, the total CPU will be the pre-processing time plus the number of iterations times the CPU for each iteration. Thus the bottleneck of the method is the calculation of the product of the impedance matrix and a column vector in each iteration step. The column vector is the solution in the previous iteration. In this case, the computational steps are still $O(N^2)$ per iteration and memory requirements are still $O(N^2)$, so these standard techniques of solving Maxwell's solvers will have large memory and CPU requirements.

For these reasons, for complicated simulation problems with many unknowns, present day electronic design automation (EDA) solvers may take days or even weeks to complete the solution of a single instance of Maxwell's equation. The advanced EDA software tools required for the high-speed circuit design have to be both memory and CPU efficient while without sacrificing the accuracy of the solutions. The EDA software tools with such performance are critical to ensure high performance and reduce time for the designed electronic products to market. It will provide a distinct competitive advantage for the circuit designers who use them because the solutions permit them to more efficiently design and evaluate their products and systems.

In recent years, two techniques have become popular to accelerate impedance matrix-column vector computation. The techniques also save on computer memory. The methods are the sparse matrix canonical grid method (SMCG) and the multi-level fast multipole method (MLFMM). Both methods have been used for large-scale 3D simulations.

The SMCG exhibits computational complexity of $O(N \log N)$ per iteration and memory requirement of $O(N)$. It operates by expanding the Green's function as a Taylor series on a canonical grid. The surface fields on the transmitted elements are first projected onto the canonical grid and then the interactions on the canonical grids are calculated simultaneously with the fast Fourier transform (FFT). The receiving fields on the canonical grids are then projected back to the scattering elements. An advantage of the SMCG method is that it only requires a translationally invariant Green's function and can be readily applied with the multi-layered medium Green's function. The SMCG method is FFT based, so that parallel implementation can be accomplished by using a parallel version of FFT.

The MLFMM method exhibits computational complexity of O(N log N) per iteration and so does memory requirements. The idea of the FMM is that instead of calculating interactions of two non-near groups directly, the transmitting field of each scattering element in the group is projected onto the group center and then only interactions between two centers are computed. The receiving field at each group center is then projected back to the scattering elements in the group. As the group becomes bigger, FMM uses interpolation and anterpolation (decimation) techniques to compute the scattering from one level of groups to the next level of groups.

The advantage of the SMCG is that it is efficient for densely packed scattering elements when the scattering elements can be translated easily to the canonical grid. It is not efficient for the sparse distributed scattering objects. This is because there are no scattering objects around some of canonical grids and we still have to include them in the calculations. The FMM, on the other hand, relies on diagonalization of the T matrix using plane waves. It is difficult to use with a multi-layered medium Green's function. Its reliance on interpolation and anterpolation also makes it difficult to parallelize efficiently. Also the method is inefficient at low and intermediate frequencies which are common for RF circuit problems because of the large number of multipoles still required for such problems.

It would therefore be desirable to develop a fast surface integral equation solver which has advantages over both the SMCG and the FMM for certain classes of problems. Such a solver should preferably apply to any Green's function, such as a multi-layered medium Green's function, and also sparsely packaged structures while keep the efficiency of matrix-vector multiplication and less memory requirements. The solver should also preferably be easy to parallelize. The solver should desirably work from low to high frequencies.

SUMMARY OF THE INVENTION

In accordance with the present invention, a fast surface integral equation solver is provided for analyzing wave propagation equations.

In general terms, the invention proposes a technique for solving an integral equation for wave equations. Using basis functions, an impedance matrix is derived from the integral equation (although the elements of the impedance matrix are not explicitly calculated). The impedance matrix is of dimension N×N. The impedance matrix is partitioned on multiple levels, so that it is decomposed into block impedance matrices. The rank r of the block impedance matrix is derived (or pre-calculated), and the block impedance matrix is written as the product of two non-square matrices, denoted U and V. Each of U and V has one linear dimension which is only of the order of r, and the present method explicitly calculates their elements. We will refer so such a method in the following text as a "UV method".

The multilevel partitioning means that different block sizes are used in the computation based on the size of the blocks and relative distance between the blocks. There is a respective block impedance matrix for each pair of blocks.

The invention is motivated by the observations that (i) due to the smoothness of Green's function, the rank of the block impedance matrix for two non-near groups of block is very low, and (ii) the rank of blocks is quite problem independent. The second factor means that a pre-determination of rank is possible. In particular, for a given class of problems it is possible to calculate a table showing typical realizations of the rank against numerical parameters of the problem, so that, for a given real problem, the correct rank can be extracted from the table.

Preferably, the method includes calculating the rank table for the problem. The rank for a given set of parameters can be determined quickly by coarse-coarse sampling or partial wave analysis.

The further apart the two blocks are, the larger the size of the blocks we can use. In doing so, the matrix size of blocks can be increased while keep the rank still low. Because the UV is applied independently to each level and each block, the procedure facilitates parallel implementation.

The rank table may be constructed showing the rank as a function of the block size of transmitting and receiving blocks, and their separation. Once the rank is known, the impedance matrix for a given transmitting and receiving block is expressed as a product of the U and V matrices.

In a first example, the impedance matrix may be describing surface integral equations. As is well-known, surface integral equation in surface scattering problems relate multiple interactions among different parts of the surface using Green's functions, which means that we only need to consider interactions of one point with another. The surface integral equations can be transformed into matrix equation through basis functions and testing functions, and the matrix equation is solved using the UV method. Surface integral equations of wave equation are useful, for example, to extract equivalent circuit parameters for electronic packaging structures, IC packages, printed circuit boards, and interconnects, and to design and analyze patch antennas, microstrip antennas, and RFIC devices.

In a second example, the impedance matrix may be describing Foldy Lax partial wave equations. Foldy Lax equation of partial waves consider the interactions among discrete particles/objects through multiple scattering and it is much more useful for volume scattering than the surface integral equation because the use of partial waves has a smaller number of unknowns. The applications of Foldy Lax equation of partial waves can be found in analyzing nano material, electronic scattering from nanostructures, photonic bandgap structures, the electronic bandstructures of nano-materials and the effective electric and magnetic properties of composite materials, and metamaterials. Foldy Lax equation has also been used to analyze the RF effects of vias in PCB. Foldy Lax equation of partial waves can be transformed into matrix equation directly using spherical waves as basis functions because it uses higher order Green's function to include scattering effects.

As discussed below, the UV method improves computational efficiency and memory requirement, to O(N log N) per iteration step and memory requirement of O(N log N) as in the SMCG and the FMM techniques owing to the multilevel interacting blocks and loosely independent rank from block sizes.

Furthermore, as discussed below, methods which are embodiments of the invention typically have some of the advantages of both the SMCG and the Furthermore, as discussed below, methods which are embodiments of the invention typically have some of the advantages of both the SMCG and the FMM. They are Green's function independent, which means we can use them even for layered medium Green's function without major modifications. For example, using the layered medium Green's function, the impedance matrix can be derived. By using coarse sampling, the rank of the block impedance matrix can next be determined. The block matrix can then be written as the product of the UV matrix. This approach is applicable from quasistatics (a distinct class of very low frequency engineering problems in which the size of the region under consideration is smaller than one wavelength) to low frequency and to high frequencies. In addition, the UV method can be applied to both densely located elements as well as sparsely located elements very efficiently. Thus it is superior to the FMM and the SMCG-FFT methods for some cases.

In the particular case, mentioned above, of using an embodiment of the invention to solve a higher order partial waves impedance matrix, since the use of partial waves already reduces the number of unknowns of the problems, applying the UV method directly to the partial waves speeds up the computation even more, making the approach highly efficient for volume scattering problems.

Specifically, one expression of the invention is a computer-implemented method for solving equations representing wave propagation within a region, the method including:
  (i) representing an integral equation describing wave propagation as a matrix equation including an impedance matrix and an unknown column vector;
  (ii) partitioning the impedance matrix on a plurality of levels as a structure of block impedance matrices, each block impedance matrix representing the interaction of two blocks of the grid;
  (iii) for each pair of blocks, each of size b×b, decomposing each block impedance matrix having a rank r as a product UV of two matrices U and V, where U has a size r times b and V has a size b times r; and
  (iv) solving the matrix equation based on using iterative method having a number of steps in each of which a column vector is multiplied by V and the result multiplied by U.

The rows and columns of the impedance matrix may be based on respective points of a grid defined spanning the region in which the wave equation is to be analyzed, or alternatively correspond to respective coefficients of a set of basis functions relating to objects in the region.

The iterative techniques in step (iv) can correspond to known iterative techniques, except that in the present invention the matrix multiplication is performed using the matrices U and V instead of the full impedance matrix. The column vector is effectively multiplied by the impedance matrix in a number of steps for each pair of blocks of order 2br.

Note furthermore that the memory requirement of storing the matrices U and V is 2br rather than $b^2$.

Note also that the method (and in particular steps (i) and (ii)) does not include a calculation of the original impedance matrix. This is because the large number of elements in the matrix makes explicit calculation of the impedance matrix too computationally intensive and will require too much memory.

The construction of the matrix U is done by sampling r points or coefficients in the receiving block, and the construction of the V matrix is done by sampling r points or coefficients from the transmitting block.

The invention may be expressed as a computer-implemented method, or as a computer apparatus programmed to perform the method, or a software product stored on a recording medium and consisting of program instructions which, when read by a computing apparatus, cause the computing apparatus to perform a method according to the invention.

In the latter case, the software product may be at least a part of an EDA software package which enables circuit design engineers to model not only individual integrated circuit components, but also complete electronic package structures and even the entire printed circuit board. The UV method can be used to reduce design risk and uncertainty and to provide necessary information to design engineers to make correct decisions. Because the method can be used for volume scattering problems with the use of partial waves as well, the methodology is also applicable to problems in materials and nanotechnology. It can be used to analyze photonic bandgap structures, the electronic scattering from nanostructures, the electronic bandstructures of nanomaterials and the electric and magnetic properties of composite materials.

As mentioned above, the method of the invention employs the rank of a block impedance matrix, and here we propose efficient ways for calculating these values. It should be understood that these methods are alternative independent aspects of the invention, since they can be used in other methods for solving wave equations than the present UV method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 schematically illustrates the interactions between two blocks at i-th level in the cases that (a) the two blocks share one common point, (b) the two blocks share one common edge;

DESCRIPTION OF THE PREFERRED EMBODIMENT

Figure 13:
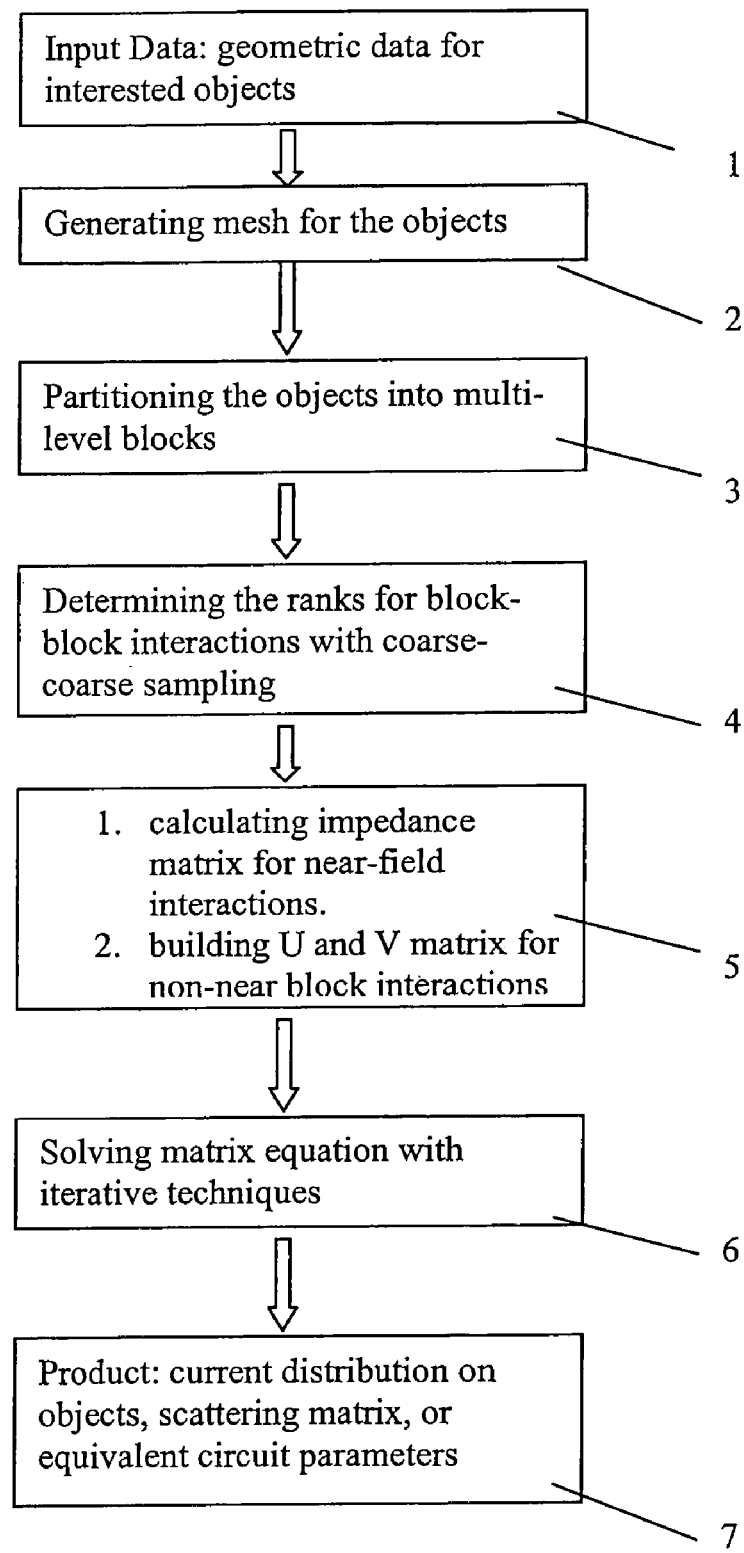
FIG. 13 shows the steps of a method which is an embodiment of the present invention.

FIG. 13 shows the steps of a method which is an embodiment of the invention. In a first step (step 1) the method loads input data, describing the situation to be analyzed. In a second step (step 2) the method generates a basis in which the analysis will be performed (which may be a grid covering the region being analyzed, or a set of basis functions as described below). In a third step (step 3) the basis is partitioned into blocks at multiple levels. The impedance matrix is also partitioned into multi-level blocks. In a fourth step (step 4) the rank of the block-block impedance matrix is calculated with coarse-coarse sampling (defined below). In a fifth step (step 5) the impedance matrix for the near-field interactions is determined. For the non-near block impedance matrix, dense-rank and rank-dense sampling (defined below) is used to construct U and V matrices. In a sixth step (step 6) the matrix equation is solved iteratively. This allows the method to generate (step 7) the current distribution and coefficients of the partial waves and output desired parameters describing the solution. These parameters may be a scattering matrix of the problem, or equivalent circuit parameters.

At this point we define the various types of sampling referred to in this document. By "dense sampling" is meant sampling is at least 10 points per wavelength, leading to b points for the block. By "rank sampling" is meant sampling is done coarsely so that the number of points in the block selected is r. By "coarse sampling" is meant sampling is done so that the number of points selected in the block is slightly larger than r. As discussed below, in generating the matrices U and V between two blocks a sampling process is used in which one of the blocks is sampled at one spacing and the other at a different spacing. The two interacting blocks are referred to as the receiving block and transmitting block. For example, by "dense-coarse" sampling is meant that the receiving block is sampled densely while the transmitting block is sampled coarsely. By "coarse-coarse" sampling is meant coarse sampling at both blocks.

We now present two examples to illustrate the method in use. Note that the invention is not limited to these examples.

The first example of the use of the method is to solve rough surface scattering using a surface integral formulation. Here a "rough surface" means a quasi-planar surface with many peaks and valleys along the surface. Note that many problems in RF circuits, PCB, on-chip structures, patch antennas are quasi-planar and are solved by a surface integral equation. Furthermore, a rough surface exists between the signal trace and the substrate material in an IC package or in a printed circuit board. The roughness facilitates the adherence of the signal trace to the substrate and is extensively used in forming circuit boards. At low frequencies, the effects of this rough interface on the signal integrity are small because the wavelength of the propagation signal on the trace is much larger than the surface roughness, but continuing advances are being made in circuit density and speed, at both chip and package level, and these have pushed the signal frequency higher and higher. At high frequency, due to the skin effect, most of currents flow at a very thin layer of conductor surface. Furthermore, owing to the attraction of opposite charges, the majority of the current flows along the bottom surface of the trace. The rough interface profile of signal trace at the bottom gives a longer traveling distance for currents compared to the flat surface case, resulting higher conductor loss. The rough interface also increases the transmission of electromagnetic energy into the substrate, giving more material loss. The wave can be decomposed into coherent and incoherent waves. The incoherent waves will contribute to noise-like behavior in the signal and also to radiation loss. In addition, the conductor skin effects and rough interfaces contribute to frequency dependent resistance and inductance parameters. Thus at high frequency, the effects of surface roughness cannot be neglected. The impact of surface roughness on signal integrity puts limitations on the design of the electronic packaging and PCB level interconnect. Thus techniques for studying the effects of this rough interface on the signal loss, signal propagation, and impedance control on signal integrity are required so that manufacture tolerance about the trace dimension can be included in the study.

As discussed below in detail, in our simulations a method as illustrated in FIG. 13 solved the rough surface scattering problem by solving a surface integral equation. The 3D problem of surface scattering is solved within 35.5 minutes CPU and 1.8 Gb for Memory with number surface unknowns of 65,000 on a single processor of 2.66 GHz.

The second example of the use of the method is to solve the volume scattering problem of a plane wave incident on cylinders in random positions. It is well known that this problem can be stated as the Foldy Lax equation of partial waves. The Foldy Lax equation is transformed into a matrix equation using spherical waves expansion and the method of FIG. 13 is used to solve the matrix equation. In our simulations an example problem with 1,024 dielectric cylinders, each of diameter of one wavelength, was solved on a single processor of 2.66 GHz using 14 minutes CPU. The geometry of wave scattering by many particles such as cylinders and spheres are encountered in problems in electron diffraction and effective electric and magnetic properties of composite and photonic band gap and meta-materials. In electron diffraction and electron band theory in nanotechnology, the particles represent the potentials created by the atoms. In waves in composite materials, the particles represent inclusions in the background medium. In photonic bandgap materials and meta-materials, the particles represent conducting small objects placed in the host medium to achieve the desired effective electric and magnetic properties.

1. Surface Integral Equation

Problem Independent Rank Table

Consider a matrix $\bar{Z}$ of dimension N×N, which represents the interactions of two non-near groups and each of them has N scatterers in the group, the rank of $\bar{Z}$ is r. We can use the single value decomposition (SVD) to determine the rank of $\bar{Z}$. Let $\sigma_1$ be the largest singular value, and the singular values be arranged in decreasing magnitude. Given a threshold $\epsilon$, the rank r defined as the lowest positive integer such that $|\sigma_{r+1}/\sigma_1| \leq \epsilon$. The threshold used is 1.e-5 in the simulation reported in this invention. Due to the smoothness of the matrix elements, the rank r is much less than the number of scatterers N. The rank r is determined by the transmitting and receiving block size and their separation distance between two block centers.

Figure 1:
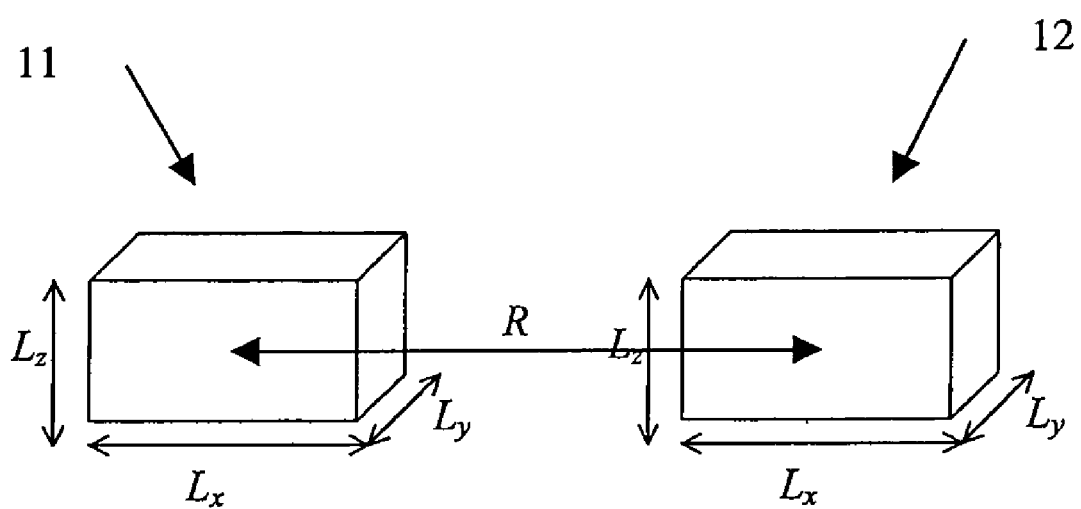
FIG. 1 schematically illustrates two non-near block interactions.

FIG. 1 shows two non-near blocks 11, 12 of size of $L_x \times L_y \times L_z$. Suppose the left block 11 is the transmitting block and the right block 12 is the receiving block. Suppose there are N points in each block. The points are labeled $\bar{r}_m$, m=1, 2, . . . N, for the receiving block and $\bar{r}_n$, n=1, 2 . . . N, for the transmitting block. Thus, the matrix $\bar{Z}$ has dimension N×N with elements $$Z_{mn} = \frac{\exp(jk|\bar{r}_m - \bar{r}_n|)}{4\pi|\bar{r}_m - \bar{r}_n|} \qquad (1)$$

In selecting the value of N, we can do so such that there are 10 points per wavelength. This corresponds to 100 points per square wavelength and 1,000 points per cubic wavelength.

The rank of the matrix can be determined. It is dependent on the size of the transmitting and receiving blocks and the separation between them.

A. Two Flat Sheets with Zero Vertical Separation

Consider two flat sheets of sizes $L_x$ and $L_y$, which are both placed on the same horizontal plane. Suppose that the centers of the two planes are on the x-axis and let R be the separation between the two centers. This case can be found for the problem currents sheets of microstrip lines and patches. To determine the rank, an area sampling technique can be used. However, the area sampling leads to large number of sampling points and requires large CPU time and memory allocation for computer. To avoid that difficulty, we use the Huygen's principle which states that the equivalent sources are the four boundary lines of the sheet. Thus the radiation can be considered as radiation from the enclosing boundary lines of the transmitting block to the boundary lines of the receiving block. We can therefore use the technique of boundary line sampling to perform rank determination. Furthermore, due to the smoothness of the Green's function, we know the rank is much less than number of sampling points. Thus we can use coarse boundary sampling to further reduce the computational cost for the rank determination.

To verify that these techniques give similar results, in the Table I(a) we list the ranks determined by the three methods (area sampling, boundary dense sampling and boundary coarse sampling) for various values of $L_x$ and $L_y$ measured in wavelengths. For the area sampling, 100 points per square wavelength were used. For the boundary dense sampling, 10 points per wavelength were used. For the boundary coarse sampling, 4 points per wavelength were used. The ranks determined obtained by each of the methods are very similar for each of the various given physical sizes of the problem shown in Table I(a). Note that the ranks are substantially smaller than the block size N.

B. Volumetric Blocks and Enclosing Boundary Radiation

Next we consider volumetric blocks of sizes $L_x \times L_y \times L_z$. The centers of the blocks are placed on the x-axis and separated by a distance R, as indicated in FIG. 1. In this case, we have used three different techniques (volume sampling, boundary dense sampling, and boundary coarse sampling) to determine the ranks for various values of $L_x$, $L_y$ and $L_z$.

For the boundary sampling, the equivalent sources are now the boundary surfaces which are the six sides of the block. Thus the radiation can be considered as radiation from the enclosing boundary surface of the transmitting block to the boundary surface of the receiving block. The ranks found by the various methods are given in Table I(b), where NA indicates "not available" because of limited computer resources. For volume sampling, 1,000 points per cubic wavelength were used. For boundary dense sampling, 100 points per square wavelength were used. For boundary coarse sampling, 16 points per square wavelength were used. For example for volumes of size $4\lambda \times 4\lambda \times 4\lambda$ and $R=8\lambda$ case, the number of points for volume sampling is 64,000.

Using boundary coarse sampling, the number of sampling points is only 1,536. This will speed up the determination of the ranks greatly for the case. The rank from this case is only 116 meaning that large matrix compression is possible. Table I(b) also shows that coarse sampling essentially gives the same rank as dense sampling. The rank can thus be determined speedily and accurately using coarse-coarse sampling.

C. Small Overestimation of Rank

As mentioned above, in SVD, the rank determination is based on a threshold. Thus there is built in variation of rank due to variations of threshold. In the applications of the present invention discussed here, the exact rank is not required. Thus, to be on the safe side, and the embodiment of the invention may use a value for the rank 10% to 20% above the "actual" rank.

Note that the selection of the blocks is dependent on the type of problem. However, once the static rank table is determined, the rank table can be applied to all problems of the same class, taking from the table the rank value having the set of parameters (e.g. $L_x$, $L_y$, $L_z$, R), in which $L_x$, $L_y$, and $L_z$ are block sizes in x, y, and z directions, respectively, and R is the distance between the two block centers.

Wave Scattering Formulation

Consider a tapered scalar plane wave $\psi_{inc}(x,y,z)$ (equation 6.1.1 in *Scattering of Electromagnetic Waves, vol. 2: Numerical Simulations;* Wiley Interscience, 2001, L. Tsang, J. A. Kong, K. H. Ding and C. O. Ao) impinging upon a 2-D rough surface with Dirichlet boundary condition and with a height profile $z=f(x,y)$. A Fredholm integral equation of the first kind can be formed. Let $\bar{r}'=\hat{x}x'+\hat{y}y'+\hat{z}f(x',y')$ denote a field point and $\bar{r}=\hat{x}x+\hat{y}y+\hat{z}f(x,y)$ denote a source point on the rough surface. Then the surface integral equation is (*Scattering of Electromagnetic Waves, vol. 2: Numerical Simulations;* Wiley Interscience, 2001, L. Tsang, J. A. Kong, K. H. Ding and C. O. Ao)

$$0 = \psi_{inc}(\bar{r}) - \int\int dx dy G_0(x,y,f(x,y); x',y',f(x',y'))U(x,y) \qquad (3)$$

where $$G_0 = \frac{\exp(ik|\bar{r} - \bar{r}'|)}{4\pi|\bar{r} - \bar{r}'|}$$

is the free-space Green's function and the unknown surface field is $U(x,y)$.

The method of moments (MoM) is used to discretize the integral equation. We use the pulse basis function and point-matching method. The resulting matrix equation is $$\bar{\bar{Z}} \cdot \bar{u} = \bar{b} \qquad (4)$$

Multi-Level Partitioning Process

Figure 2:
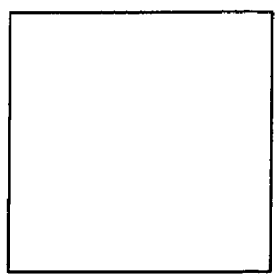
FIG. 2 schematically illustrates a multilevel partitioning process used in an embodiment of the invention.
Figure 2:
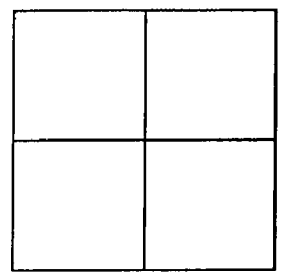
Figure 2:
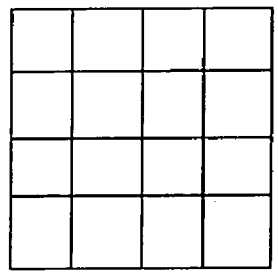

FIG. 2(a) shows a square area. FIG. 2(b) shows this square area is split into 4 blocks. Each of 4 blocks is subgroup at the Pth level, which has the largest group size. FIG. 2(c) shows that each sub-block is split into another 4 small groups. This splitting process is continued until we reach the smallest group size, which is at the $1^{st}$ level. We decompose the full impedance matrix in equation (4) as the sum of P sparse matrixes as in follows.

$$\bar{\bar{Z}} = \bar{\bar{Z}}^{(0)} + \bar{\bar{Z}}^{(1)} + \bar{\bar{Z}}^{(2)} + \Lambda + \bar{\bar{Z}}^{(P-1)} \qquad (5)$$

Matrix $\bar{\bar{Z}}^{(0)}$ includes all the interactions among neighboring groups (including self group) at the $1^{st}$ level. Matrix $\bar{\bar{Z}}^{(1)}$ includes all the interactions among neighboring groups at the $2^{nd}$ level. It consists of blocks in the first level. Similarly, matrix $\overline{\overline{Z}}^{(i)}$ includes all the interactions among neighboring groups at the (i+1)th level, but these consist of blocks in the ith level.

To facilitate understanding of the multilevel partitioning process, we give an example that has 64 subgroups at the $1^{st}$ level. Assume each group has M elements. For this example, the highest level is P=3. Thus $\overline{\overline{Z}} = \overline{\overline{Z}}^{(0)} + \overline{\overline{Z}}^{(1)} + \overline{\overline{Z}}^{(2)}$ and the impedance matrix of $\overline{\overline{Z}}$ is 64M by 64M and has 4,096 M by M blocks.

Figure 3C:
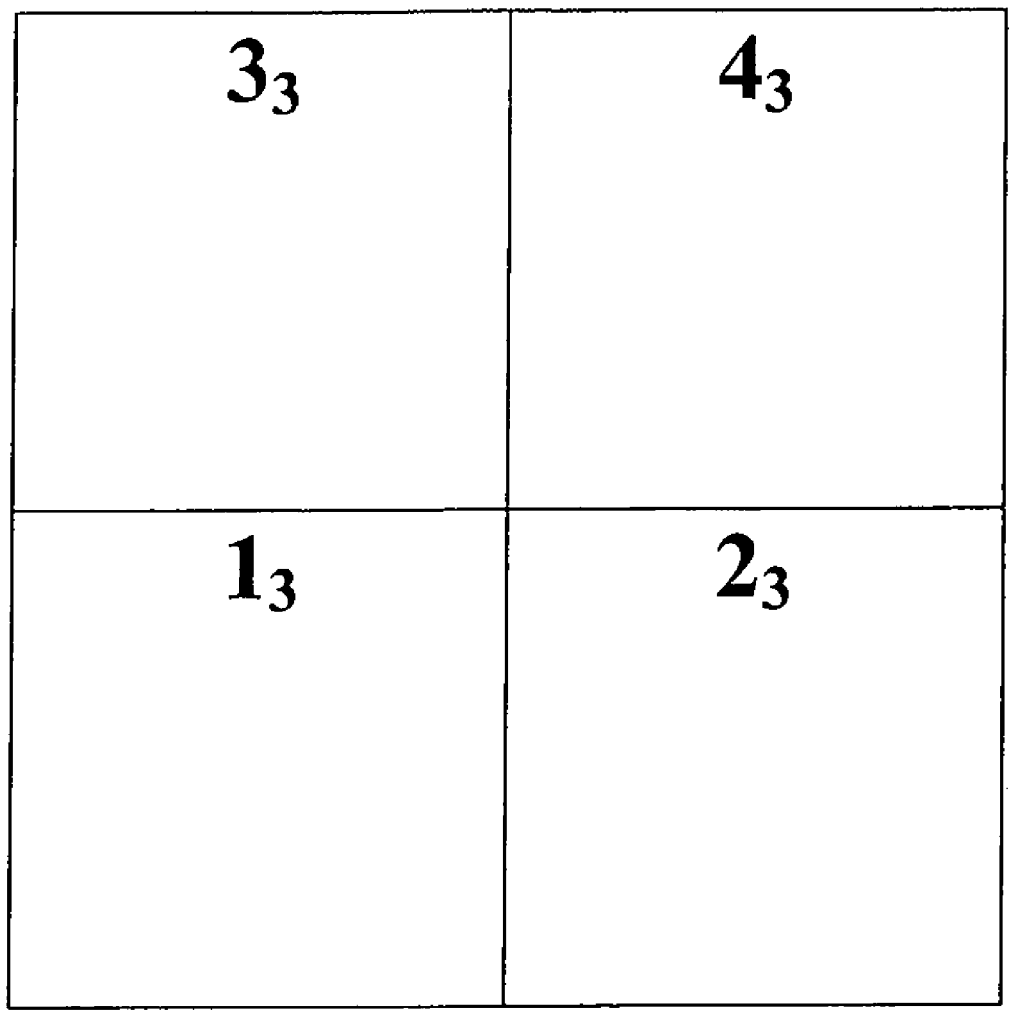
FIG. 3 schematically illustrates the multilevel partitioning process of FIG. 2 with (a) 64 first level groups; (b) 16 second level groups; (c) 4 third level groups.

FIG. 3(a) shows the 64 subgroups of the $1^{st}$ level which are marked as $1_1, 2_1, \ldots, 64_1$. FIG. 3(b) shows the level 2 groups and they are marked as $1_2, 2_2, \ldots, 16_2$. Each of the level 2 groups has 4 level 1 groups. For example, the group $3_2$ has 4 groups of $5_1, 6_1, 13_1$, and $14_1$. FIG. 3(c) shows the level 3 groups and they are marked as $1_3, 2_3, 3_3$, and $4_3$. Each of the level 3 groups has 4 level 2 groups. For example, the group $2_3$ has 4 groups of $3_2, 4_2, 7_2$, and $8_2$.

We use $m_i$ to represent the group m of the level i. Then matrix $\overline{\overline{Z}}_{m_i n_i}$ represents the interactions between the receiving group m and transmitting group n of the ith level. Since the four level 1 groups form a level 2 group and 4 level 2 groups form a level 3 group, we have $\overline{\overline{Z}}_{m_1 n_1}$ = dimension of M by M $\overline{\overline{Z}}_{m_2 n_2}$ = dimension of 4M by 4M Three examples are $$\overline{\overline{Z}}_{3_2 5_2} = \begin{bmatrix} \overline{\overline{Z}}_{5_1 17_1} & \overline{\overline{Z}}_{5_1 18_1} & \overline{\overline{Z}}_{5_1 25_1} & \overline{\overline{Z}}_{5_1 26_1} \\ \overline{\overline{Z}}_{6_1 17_1} & \overline{\overline{Z}}_{6_1 18_1} & \overline{\overline{Z}}_{6_1 25_1} & \overline{\overline{Z}}_{6_1 26_1} \\ \overline{\overline{Z}}_{13_1 17_1} & \overline{\overline{Z}}_{13_1 18_1} & \overline{\overline{Z}}_{13_1 25_1} & \overline{\overline{Z}}_{13_1 26_1} \\ \overline{\overline{Z}}_{14_1 17_1} & \overline{\overline{Z}}_{14_1 18_1} & \overline{\overline{Z}}_{14_1 25_1} & \overline{\overline{Z}}_{14_1 26_1} \end{bmatrix} \quad (6)$$

$$\overline{\overline{Z}}_{6_2 5_2} = \begin{bmatrix} \overline{\overline{Z}}_{19_1 17_1} & \overline{\overline{Z}}_{19_1 18_1} & \overline{\overline{Z}}_{19_1 25_1} & \overline{\overline{Z}}_{19_1 26_1} \\ \overline{\overline{Z}}_{20_1 17_1} & \overline{\overline{Z}}_{20_1 18_1} & \overline{\overline{Z}}_{20_1 25_1} & \overline{\overline{Z}}_{20_1 26_1} \\ \overline{\overline{Z}}_{27_1 17_1} & \overline{\overline{Z}}_{27_1 18_1} & \overline{\overline{Z}}_{27_1 25_1} & \overline{\overline{Z}}_{27_1 26_1} \\ \overline{\overline{Z}}_{28_1 17_1} & \overline{\overline{Z}}_{28_1 18_1} & \overline{\overline{Z}}_{28_1 25_1} & \overline{\overline{Z}}_{28_1 26_1} \end{bmatrix} \quad (7)$$

$$\overline{\overline{Z}}_{1_3 2_3} = \begin{bmatrix} \overline{\overline{Z}}_{1_2 3_2} & \overline{\overline{Z}}_{1_2 4_2} & \overline{\overline{Z}}_{1_2 7_2} & \overline{\overline{Z}}_{1_2 8_2} \\ \overline{\overline{Z}}_{2_2 3_2} & \overline{\overline{Z}}_{2_2 4_2} & \overline{\overline{Z}}_{2_2 7_2} & \overline{\overline{Z}}_{2_2 8_2} \\ \overline{\overline{Z}}_{5_2 3_2} & \overline{\overline{Z}}_{5_2 4_2} & \overline{\overline{Z}}_{5_2 7_2} & \overline{\overline{Z}}_{5_2 8_2} \\ \overline{\overline{Z}}_{6_2 3_2} & \overline{\overline{Z}}_{6_2 4_2} & \overline{\overline{Z}}_{6_2 7_2} & \overline{\overline{Z}}_{6_2 8_2} \end{bmatrix} \quad (8)$$

The Blocks in $\overline{\overline{Z}}^{(0)}$

In $\overline{\overline{Z}}^{(0)}$, we represent the interactions of the level 1 groups with their nearest neighbors. For example, $20_1$ has 8 neighbors of $11_1, 12_1, 13_1, 19_1, 21_1, 27_1, 28_1$, and $29_1$. Thus $\overline{\overline{Z}}^{(0)}$ includes $\overline{\overline{Z}}_{11_1 20_1}, \overline{\overline{Z}}_{12_1 20_1}, \overline{\overline{Z}}_{13_1 20_1}, \overline{\overline{Z}}_{19_1 20_1}, \overline{\overline{Z}}_{20_1 20_1}, \overline{\overline{Z}}_{21_1 20_1}, \overline{\overline{Z}}_{27_1 20_1}, \overline{\overline{Z}}_{28_1 20_1}$, and $\overline{\overline{Z}}_{29_1 20_1}$, a total of 9 matrices. Note that self-interaction is also included in here. We note that: 1) block size of $\overline{\overline{Z}}_{m m_1 n_1}$ is M by M; 2) there are 36 interior $1^{st}$ level groups of 9 blocks=36*9=324 (M by M) blocks; 3) 24 edge $1^{st}$ level groups of 6 blocks=24*6=144 (M by M) blocks; 4) 4 corner $1^{st}$ level groups of 4 blocks=4*4=16 (M by M) blocks. Thus $\overline{\overline{Z}}^{(0)}$ has total of 324+144+16=484 (M by M) blocks.

The Blocks in $\overline{\overline{Z}}^{(1)}$

In $\overline{\overline{Z}}^{(1)}$, we select the interactions between level 2 groups and their nearest neighbors. For example, we need to include $\overline{\overline{Z}}_{6_2 5_2}$. However, we need to exclude those that have been included $\overline{\overline{Z}}^{(0)}$. Thus, we define the impedance matrix primes, such as $$\overline{\overline{Z}}'_{6_2 5_2} = \begin{bmatrix} \overline{\overline{Z}}_{19_1 17_1} & \overline{\overline{0}}_1 & \overline{\overline{Z}}_{19_1 25_1} & \overline{\overline{0}}_1 \\ \overline{\overline{Z}}_{20_1 17_1} & \overline{\overline{Z}}_{20_1 18_1} & \overline{\overline{Z}}_{20_1 25_1} & \overline{\overline{Z}}_{20_1 26_1} \\ \overline{\overline{Z}}_{27_1 17_1} & \overline{\overline{0}}_1 & \overline{\overline{Z}}_{27_1 25_1} & \overline{\overline{0}}_1 \\ \overline{\overline{Z}}_{28_1 17_1} & \overline{\overline{Z}}_{28_1 18_1} & \overline{\overline{Z}}_{28_1 25_1} & \overline{\overline{Z}}_{28_1 26_1} \end{bmatrix} \quad (9)$$

where $\overline{\overline{0}}_1$ is the zero matrix of dimension (M-by-M). $\overline{\overline{Z}}^{(1)}$ includes all the $\overline{\overline{Z}}'_{m_2 n_2}$ where $m_2$ and $n_2$ are neighbors. As shown in equation (9), the matrix $\overline{\overline{Z}}'_{m_2 n_2}$ (I) consists of blocks with size of M by M; and (II) each block consists of a transmitting and a receiving region that are not neighbors of each other. E.g. in $\overline{\overline{Z}}_{19_1 17_1}$, the receiving region is $19_1$ and the transmitting region is $17_1$ and the two are not neighbors of each other; and (III) the separation R between the transmitting and the receiving regions is at a minimum of 2S for $\overline{\overline{Z}}_{19_1 17_1}$, where S is the block size. It is at a maximum of R=3 $\sqrt{2}$S for $\overline{\overline{Z}}_{44_1 17_1}$ which is in $\overline{\overline{Z}}'_{10_2 5_2}$. Thus $\overline{\overline{Z}}^{(1)}$ includes 1) 4 interior level 2 groups which have 8 neighbors. 4 of them have 12 blocks while 4 of them have 15 blocks. The total blocks are 4*(4*12+4*15)=432.

2) 8 edge level 2 groups which have 5 neighbors. 3 of them have 12 blocks while 2 of them have 15 blocks. The total blocks are 8*(3*12+2*15)=528.

3) 4 corner level 2 groups which have 3 neighbors. 2 of them have 12 blocks and 1 has 15 blocks. The total blocks are 4*(2*12+1*15)=156.

Thus matrix $\overline{\overline{Z}}^{(1)}$ includes 432+528+156=1116 (M by M) blocks.

The Blocks in $\overline{\overline{Z}}^{(2)}$

In $\overline{\overline{Z}}^{(2)}$, we describe the interactions between level 3 groups and their nearest neighbors. For example, we need to include $\overline{\overline{Z}}_{1_3 2_3}$. However, some of the interactions have already been included in $\overline{\overline{Z}}^{(0)}$ and $\overline{\overline{Z}}^{(1)}$ and need to be excluded. We define the prime impedance matrices, such as:

$$\overline{\overline{Z}}'_{1_3 2_3} = \begin{bmatrix} \overline{\overline{Z}}_{1_2 3_2} & \overline{\overline{Z}}_{1_2 4_2} & \overline{\overline{Z}}_{1_2 7_2} & \overline{\overline{Z}}_{1_2 8_2} \\ \overline{\overline{0}}_2 & \overline{\overline{Z}}_{2_2 4_2} & \overline{\overline{0}}_2 & \overline{\overline{Z}}_{2_2 8_2} \\ \overline{\overline{Z}}_{5_2 3_2} & \overline{\overline{Z}}_{5_2 4_2} & \overline{\overline{Z}}_{5_2 7_2} & \overline{\overline{Z}}_{5_2 8_2} \\ \overline{\overline{0}}_2 & \overline{\overline{Z}}_{6_2 4_2} & \overline{\overline{0}}_2 & \overline{\overline{Z}}_{6_2 8_2} \end{bmatrix} \quad (11)$$

Note that the building blocks of $\overline{\overline{Z}}'_{1_3 2_3}$ are level 2 blocks and are of size of (4M by 4M)=16 M by M. This is important that as the level goes up, the block size will grow by 4 times as we go up each level. We have 4 level 3 groups and each of them has 2 neighbors with 12 level 2 blocks and 1 neighbor with 15 level 2 blocks. Thus, we have 4*(2*12+1*15)=156 level 2 blocks. Since each level 2 block has 16 level 1 blocks. Thus we have a total of 16*156=2,496 level 1 blocks in $\overline{\overline{Z}}^{(2)}$.

Thus the total count is 484+1,116+2,496=4,096. Thus all the level 1 blocks are counted exactly once. To summarize, the block size in $\bar{Z}^{(0)}$ is of M by M, in $\bar{Z}^{(1)}$ is of M by M, and in $\bar{Z}^{(2)}$ is of 4M by 4M. In applying UV decomposition, the UV is applied to each block for that level. Each block consists of a transmitting and a receiving region that are not neighbors of each other. However, their separations are within a restricted range as indicated before.

The UV Method

The matrix $\bar{Z}_{m_i n_i}$, which represents the interactions of two non-neighbor groups $m_i$ and $n_i$, can be represented by UV decomposition. The matrix $\bar{Z}_{m_i n_i}$ is of dimensions $4^{(i-1)}$ M by $4^{(i-1)}$M. The rank of $\bar{Z}_{m_i n_i}$, r, is much smaller than $4^{(i-1)}$M. For simpler notation, we denote $\bar{Z}_{m_i n_i}$ by $\bar{A}$, which has dimension of N by N and rank of r with r<<N. To decompose $\bar{A}$ by the SVD and Gram-Schmidt process will consume CPU because N is large. Note that in Section 2, we apply the SVD to find r. But because of coarse sampling, the selected matrices are only of dimension of r by r only.

Let the l-th column of $\bar{A}$ be denoted by $\bar{a}_l$, where l=1, 2, Λ, N. Then $A_{mn}=(\bar{a}_n)_m$. The element $A_{mn}$ is the mth element of the column vector $\bar{a}_n$. However there are only r independent columns. In the transmitting region, we select r points from the N points. The r points are uniformly distributed in the transmitting region.

We compute the r columns $\bar{u}_l$, l=1, 2, Λ,r. Each column is of dimension of N and coincides with a column of $\bar{A}$.

$$U_{ml}=(\bar{u}_l)_m=A_{mp(l)}, m=1, 2, \Lambda, N \quad (12)$$

where p(l) is a column index of $\bar{A}$ that depends on l. Note that to get $U_{ml}$, one needs to go through all the N points in the receiving region. Thus the matrix $\bar{U}$ has Nr elements.

Because of linear independence, any general column $\bar{a}_m$ of $\bar{A}$ is a linear combination of $\bar{u}_l$, that is $$\bar{a}_m = \sum_{l=1}^{r} v_{lm}\bar{u}_l, m = 1, 2, \Lambda, N \quad (13)$$

where $v_{lm}$ are the coefficients to be determined.

We pick r rows of $\bar{A}$, which has total of Nr elements. The r rows correspond to r points in the receiving group. The r points are uniformly distributed in the receiving group. We first put these rows in a matrix of $\bar{R}$.

$$R_{m_a p}=A_{m(m_a)p}, p=1, 2, \Lambda, N \text{ and } m_a=1, 2, \Lambda, r \quad (14)$$

We pick the $m_a$ rows in $\bar{u}_l$, l=1, 2, . . . , r. That will give us r×r matrix and we call it $\tilde{U}$ and we have $\tilde{U}_{m_a n_a}=(\bar{u}_{n_a})_{m(m_a)}$. Then we set $$R_{m_a l} = \sum_{n_a=1}^{r} \tilde{U}_{m_a n_a} v_{n_a l}, l = 1, 2, \Lambda, N. \quad (15)$$

In matrix notation, $\bar{V}$=r×N, $\bar{R}$=r×N, $\tilde{U}$=r×r, $\bar{R}$=$\tilde{U}\bar{V}$, and $\bar{V}=(\tilde{U})^{-1}\bar{R}$. This completes the UV decomposition.

$$\bar{A}=\bar{U}\bar{V} \quad (16)$$

To summarize, we take r columns of $\bar{A}$ and then r rows of N elements, a total of 2rN elements. We need to take the inverse of an r by r matrix $\tilde{U}$ and matrix multiply an r by r matrix by an r by N matrix. The computational and memory efficiency is achieved when r<<N.

Computational Complexity Analysis

A. Multi-Level Group Sizes and Number of Groups

The rough surface is generated in a square area with $\sqrt{N}$ points in x direction and $\sqrt{N}$ points in y direction. So the total number of patches is N. We use P level various subgroup sizes to partition the whole area as follows:

1. At Pth level, we split the whole area as 4 groups. Each group has N/4 elements.

$$L_P=4=2^{2(P-P+1)} \quad (17)$$

$$M_P=N/4=N/L_P \quad (18)$$

Where $L_P$ is number of groups and $M_P$ is number of elements of each group at Pth level.

2. Split each group as 4 subgroups and continue this partitioning, at ith level, we have $$L_i=2^{2(P-i+1)} \quad (19)$$

$$M_i=N/L_i \quad (20)$$

3. At 1st level, we have $$L_1=2^{2P} \quad (21)$$

$$M_1=N/L_1 \quad (22)$$

B. Cost Function at the ith Level

In $\bar{Z}^{(i)}$, we select the interactions between level (i+1) groups and their nearest neighbors. However, some of the interactions have already been included in the lower level groups. They are to be excluded at the ith level. There are two kinds of neighboring groups. One is that sharing only one common point and the other is that sharing one common edge.

1) Sharing Only One Common Point

FIG. 4(a) shows two neighboring groups of $m_{(i+1)}$ and $n_{(i+1)}$ sharing only one common point. The impedance matrix that will be calculated is $$\bar{Z}'_{m_{(i+1)}n_{(i+1)}} = \begin{bmatrix} \bar{Z}_{m_i^{(1)}n_i^{(1)}} & \bar{Z}_{m_i^{(1)}n_i^{(2)}} & \bar{Z}_{m_i^{(1)}n_i^{(3)}} & \bar{Z}_{m_i^{(1)}n_i^{(4)}} \\ \bar{Z}_{m_i^{(2)}n_i^{(1)}} & 0_i & \bar{Z}_{m_i^{(2)}n_i^{(3)}} & \bar{Z}_{m_i^{(2)}n_i^{(4)}} \\ \bar{Z}_{m_i^{(3)}n_i^{(1)}} & \bar{Z}_{m_i^{(3)}n_i^{(2)}} & \bar{Z}_{m_i^{(3)}n_i^{(3)}} & \bar{Z}_{m_i^{(3)}n_i^{(4)}} \\ \bar{Z}_{m_i^{(4)}n_i^{(1)}} & \bar{Z}_{m_i^{(4)}n_i^{(2)}} & \bar{Z}_{m_i^{(4)}n_i^{(3)}} & \bar{Z}_{m_i^{(4)}n_i^{(4)}} \end{bmatrix} \quad (23)$$

The dimension of matrix $\bar{Z}_{m_i n_i}$ is of $M_i$ by $M_i$. The computational steps for $\bar{Z}_{m_i n_i} \cdot \bar{b}_{M_i}$ through the UV is of $2M_i r_i$, where $r_i$ is the rank $\bar{Z}_{m_i n_i}$. In here we assume the rank $r_i$ of $\bar{Z}_{m_i n_i}$ is same for all block interactions at the same level. There are 15 non-zero matrices of $\bar{Z}_{m_i n_i}$ in the $\bar{Z}'_{m_{(i+1)}n_{(i+1)}}$. The total computational steps for $\bar{Z}'_{m_{(i+1)}n_{(i+1)}} \cdot \bar{b}_{M_{(i+1)}}$ are $30M_i r_i$.

2) Sharing One Common Edge

FIG. 4(b) shows two neighboring groups of $m_{(i+1)}$ and $n_{(i+1)}$ sharing one common edge. The impedance matrix that will be calculated is $$\bar{Z}'_{m_{(i+1)}n_{(i+1)}} = \begin{bmatrix} \bar{Z}_{m_i^{(1)}n_i^{(1)}} & 0_i & \bar{Z}_{m_i^{(1)}n_i^{(3)}} & 0_i \\ \bar{Z}_{m_i^{(2)}n_i^{(1)}} & \bar{Z}_{m_i^{(2)}n_i^{(2)}} & \bar{Z}_{m_i^{(2)}n_i^{(3)}} & \bar{Z}_{m_i^{(2)}n_i^{(4)}} \\ \bar{Z}_{m_i^{(3)}n_i^{(1)}} & 0_i & \bar{Z}_{m_i^{(3)}n_i^{(3)}} & 0_i \\ \bar{Z}_{m_i^{(4)}n_i^{(1)}} & \bar{Z}_{m_i^{(4)}n_i^{(2)}} & \bar{Z}_{m_i^{(4)}n_i^{(3)}} & \bar{Z}_{m_i^{(4)}n_i^{(4)}} \end{bmatrix} \quad (24)$$

There are 12 non-zero matrices of $\bar{Z}_{m_i n_i}$ in the $\bar{Z}'_{m_{(i+1)} n_{(i+1)}}$. The total computational steps for $\bar{Z}'_{m_{(i+1)} n_{(i+1)}} \cdot \bar{b}'_{M_{(i+1)}}$ are $24 M_i r_i$.

3) Interior groups: interior groups have 8 neighbors. 4 of them share only one common point and 4 of them share one common edge. There are $(L_{(i+1)}^{1/2}-2)^2$ interior groups at $(i+1)$th level. Thus computational steps for the interior groups at the ith level are $$(L_{(i+1)}^{1/2}31\ 2)^2(4*30 M_i r_i + 4*24 M_i r_i) = 216(L_{(i+1)}^{1/2}-2)^2 M_i r_i \qquad (25)$$

4) Edge groups: edge groups have 5 neighbors. 2 of them share only one common point and 3 of them share one common edge. There are $4(L_{(i+1)}^{1/2}-2)$ edge groups at $(i+1)$th level. Thus computational steps for the edge groups at the ith level are $$4(L_{(i+1)}^{1/2}-2)(2*30 M_i r_i + 3*24 M_i r_i) = 528(L_{(i+1)}^{1/2}-2) M_i r_i \qquad (26)$$

5) Corner groups: corner groups have 3 neighbors. One of them shares only one common point and 2 of them share one common edge. There are 4 corner groups at $(i+1)$th level. Thus computational steps for the corner groups at the ith level are $$4(1*30 M_i r_i + 2*24 M_i r_i) = 312 M_i r_i \qquad (27)$$

6) Total computational steps at ith level are $$216(L_{(i+1)}^{1/2}-2)^2 M_i r_i + 528(L_{(i+1)}^{1/2}-2) M_i r_i + 312 M_i r_i = 2 M_i r_i (108 L_{(i+1)} - 168 L_{(i+1)}^{1/2} + 60) \qquad (28)$$

C. Cost Function for the Multilevel UV Method (Non-Near Block Impedance Matrix)

The total computational steps for non-neighbor block interactions through the multilevel UV decomposition are then $$\sum_{i=1}^{P-1} 2 r_i M_i [108 L_{(i+1)} - 168 L_{(i+1)}^{1/2} + 60)] \qquad (29)$$

Generally, the rank of each level block increases with the increase of block size. For simplicity, we assume $r_i$ to be a constant, and we write as r. We put this r into equation (29). Then we have $$27 r N \log_2\left(\frac{N}{M_1}\right) + 60 r N - 120 r M_1 \qquad (30)$$

D. Cost Function for Near Field Interactions in $\bar{Z}^{(0)}$

All the near field interactions are included in the matrix $\bar{Z}^{(0)}$. The product of $\bar{Z}^{(0)}$ and column vector is computed directly. The block size in $\bar{Z}^{(0)}$ is of dimension of $M_1$ by $M_1$. The computational steps for the block and block interaction are $M_1^2$.

1) Interior group: interior group has 9 blocks (including self-interaction). There are $(L_1^{1/2}-2)^2$ interior groups at the 1st level. Thus computational steps for the interior groups at the 1st level are $9(L_1^{1/2}-2)^2 M_1^2$.

2) Edge groups: edge group has 6 blocks (including self-interaction). There are $4(L_1^{1/2}-2)$ edge groups at the 1st level. Thus computational steps for the edge groups at the 1st level are $6(L_1^{1/2}-2) M_1^2$.

3) Corner groups: corner group has 4 blocks (including self). There are 4 corner groups at the 1st level. Thus computational steps for the corner groups at the 1st level are $4 M_1^2$.

4) The total computational steps for near field interaction is then $$9(L_1^{1/2}-2)^2 M_1^2 + 6(L_1^{1/2}-2) M_1^2 + 4 M_1^2 = (9 N M_1 - 12 N^{1/2} M_1^{3/2} + 4 M_1^2) \qquad (31)$$

E. Cost Function

The total computational steps for multi-level partitioning UV is sum of the near and non-near interactions and is given by $$27 r N \log_2\left(\frac{N}{M_1}\right) + 60 r N - 120 r M_1 + (9 N M_1 - 12 N^{1/2} M_1^{3/2} + 4 M_1^2) \qquad (32)$$

Numerical Results and Discussion

The numerical simulation results are presented in terms of the bistatic scattering coefficients normalized by the incident power. After the matrix equation is solved by iteration, the column vector is obtained. The column vector(s) are the solutions of the surface fields of the surface integral equation. The normalized bistatic scattering coefficient $\gamma(\hat{k}_s)$ in the direction of $\hat{k}_s$ is calculated by a weighted integration of the surface field (equation 6.1.16, *Scattering of Electromagnetic Waves, vol. 2: Numerical Simulations;* Wiley Interscience, 2001, L. Tsang, J. A. Kong, K. H. Ding and C. O. Ao). Simulations are based on Gaussian random rough surfaces with Gaussian correlation functions. The computer used in the simulations is a Pentium single processor of 2.6 GHz with 2 Gb memory. We have implemented both the SVD based QR method and the embodiment described above. First, we will illustrate the rank for the rough surface.

A. Rank Determination for Random Rough Surface

For the rough surface scattering problem, the vertical sizes of the blocks are changed due to the randomness of surface height. Thus we use the coarse-coarse area sampling to determine the rank. In the simulation, 16 points per square wavelength (instead of 100 points per square wavelength) are used for rank determination. In table II, we show the ranks as functions of the horizontal size, vertical size, and distance between two group centers. The vertical size is defined as the maximum height of the surface minus the minimum height of the surface in the same block. The results are obtained through one realization of rough surface profiles with the given rms height of 0.5 wavelength and correlation length of 0.707 wavelength.

B. CPU for the UV

In table II, we list the CPU time based on the UV method for different number of surface unknowns. The rms height and correlation length of the rough surface for all the cases is 0.5 wavelengths and 0.707 wavelengths, respectively. The preprocessing time of the UV method is time used to find the rank based on coarse-coarse sampling and the time to construct U and V matrix. The CPU time for CG means the CPU time spent for solving the matrix equation after the matrix-filling and preprocessing is finished and CPU time per iteration is the time for each iteration. For the case of 65,536 surface unknowns, it takes about 34 minutes for the total CPU and 35.88 seconds for each iteration.

Figure 5:
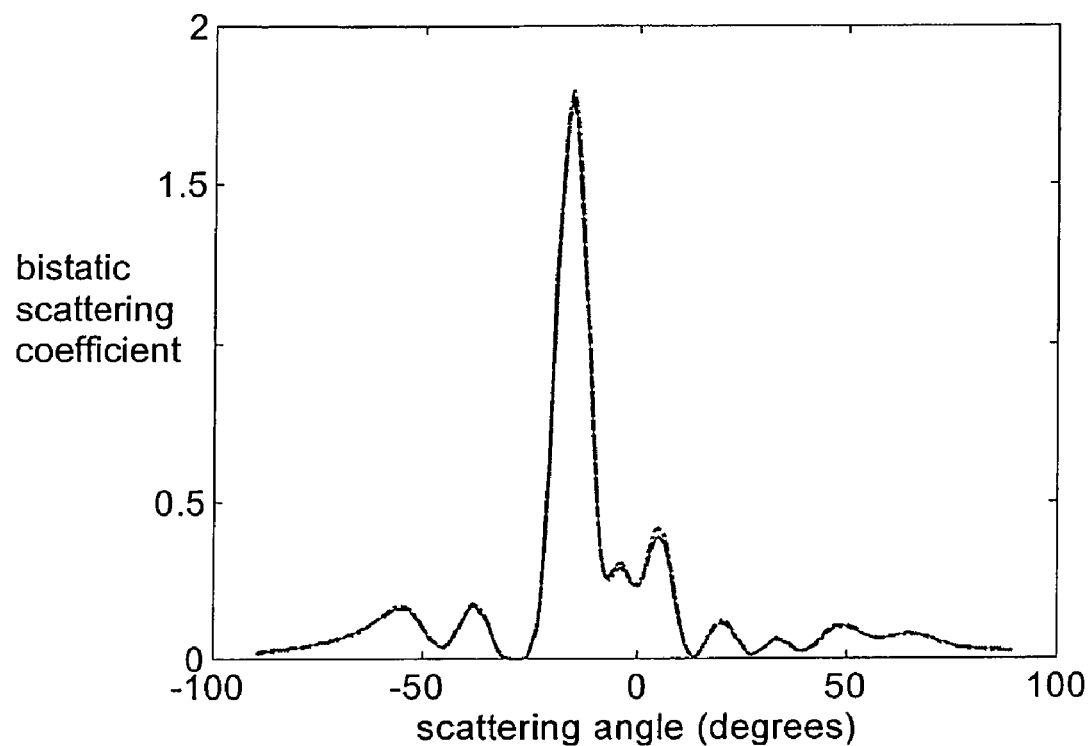
FIG. 5 is a graphical representation of bistatic scattering coefficients versus scattering angle, comparing the results of the embodiment to an exact solution and to an SVD-based QR method.

C. Comparisons of the Bistatic Scattering Coefficients Simulated from Different Methods for Single Realization FIG. 5 shows the bistatic scattering coefficients as a function of the scattering angles. The rms height and correlation length is 0.5 wavelengths and 0.707 wavelengths, respectively. The incidence angle is 20 degree. The surface lengths are 8 by 8 wavelengths and we use 64 points per square wavelength to generate the rough surface. The results simulated from three methods are shown, which are exact solution of the matrix equation, solution based on the SVD-based QR method, and the solution of the UV method. All of them are in such good agreement that the lines overlie each other perfectly, to the resolution shown in FIG. 5.

Figure 6:
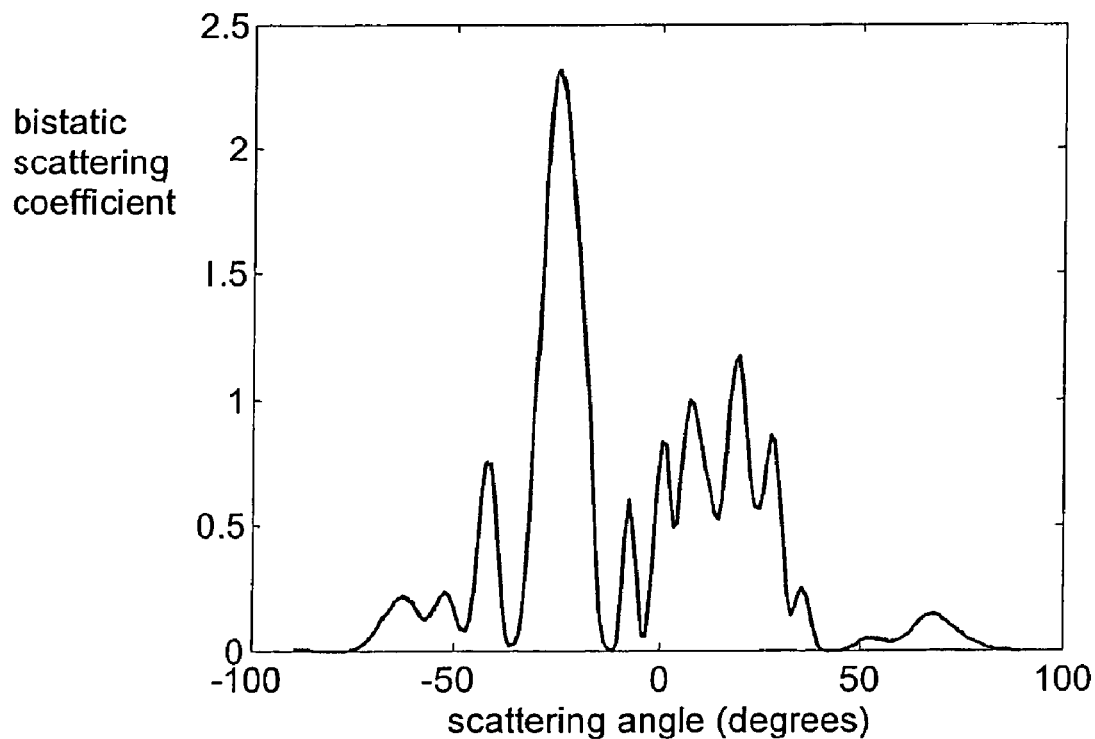
FIG. 6 is a graphical representation of bistatic scattering coefficients versus scattering angle, comparing the solutions of the embodiment with the SVD-based QR solutions for one realization.

To demonstrate that the proposed algorithm can be used also for large number of surface unknowns, we plot the simulation results for the case of rms height of 0.5 wavelengths and correlation length of 0.707 wavelengths at the incidence angle of 20 degrees. FIG. 6 shows these results. The surface lengths are 16 by 16 wavelengths but we use 256 points per square wavelength to sample the rough surface. Again, good agreements are observed at all scattering angles between the simulation results from the SVD-based QR method and the UV.

2. Foldy Lax Equation of Partial Waves

In volume scattering, the particles are of finite size and can be larger than or comparable to the wavelength. Thus a point discretization as performed for the previous rough surface case becomes inefficient. Instead, a high order partial wave expansion becomes advantageous for the case of volume scattering. A customary method is to use cylindrical waves of higher order for the 2 dimensional case and spherical waves of higher order for the three dimensional case. The impedance matrix of the Foldy Lax equations will represent the coupling of the coefficients of these partial waves. Thus, the Foldy Lax impedance matrix generally will include higher order Green's functions.

Problem Independent Rank Table

Figure 7:
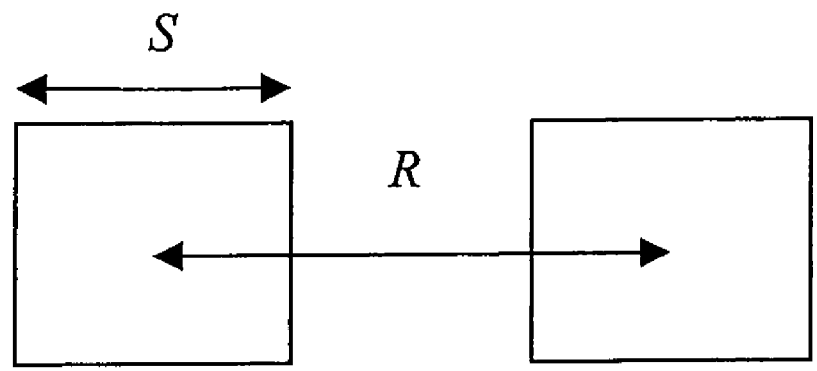
FIG. 7 schematically illustrates two non-near block interactions for volume scattering.

We describe two methods of pre-determination of rank of the Foldy lax impedance matrix in volume scattering. FIG. 7 shows two square blocks each of side S which is separated by distance R. Because of multi-level portioning, we have $2S \leq R \leq C_D S$, where $C_D$ is a constant depending on the dimension of the problem.

(1) Method of Volume Discretization or Boundary Discretization

A. Volume Discretization:

We discretize the blocks by 100 points per square wavelength. Let there be N points in the transmitting block and N points in the receiving block. Let receiving points be denoted by $\rho_p$, p=1, 2, . . . N, and the transmitting points denoted by $\rho_q$, q=1, 2, . . . N. The Green's function from point to point radiation in 2D problem is $$Z_{pq} = \frac{i}{4} H_0^{(1)}(k|\rho_p - \rho_q|) \quad (33)$$

Then the impedance matrix is of dimension N×N.

B. Enclosing Boundary Radiation

By Huygen's principle, the equivalent sources are the boundary surfaces which are the 4 sides of the block. Thus the radiation can be considered as radiation from the enclosing boundary surface of the transmitting block to the boundary surface of the receiving block. Choosing the boundary reduces the number of points and yet gives a similar rank for the impedance matrix.

C. Coarse Sampling

As the block size becomes bigger, the above method become prohibitive. However, we know from previous experience that the rank is much smaller than the size of the matrix. Thus we can use much coarser sampling. We use the terminology that dense sampling is the usual 10 points/wavelength for boundary or volume sampling (or, more generally, at least 5 points/wavelength), whereas coarse sampling means that we pick the number of points to be slightly larger than the rank. This means we have a priori knowledge of roughly what is the rank which is quite easy to gain based on the numerical experiments carried out. In forming a matrix, we need to select the number of points in the receiving region and a set of points in the transmitting region. Thus we have (receiving sampling)-(transmitting sampling). This means that we can have "dense-coarse sampling" meaning dense in the receiving region and coarse in the transmitting region. Other combinations are, coarse-dense, rank-rank etc. To establish the rank of a matrix, we find that it is sufficient to have coarse-coarse sampling. Thus we use coarse-coarse sampling and then apply SVD to determine the rank.

(2) Method of Using Two Circular Cylinders

We can replace the transmitting and receiving block by two cylinders of diameter $$D_b = \frac{2S}{\sqrt{\pi}}.$$

Figure 8:
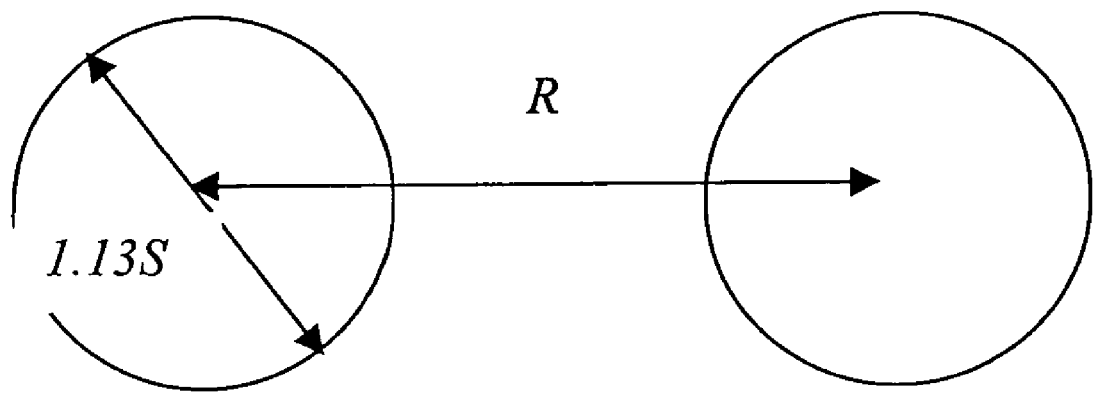
FIG. 8 schematically illustrates rank determination with the cylindrical wave expansions.

The cylinder will have the same area as the square. FIG. 8 shows these two cylinders. The centers of the receiving cylinder and the transmitting cylinder are respectively $\overline{\rho}_r$ and $\overline{\rho}_t$. If partial waves are used to describe the waves from the transmitting cylinder to the receiving cylinder, let us truncate the partial waves at $N_c^b = 0.75 \, kD_b$. We use b for block to denote the fact that, in this rank determination step, these equivalent two large cylinders are just for the sake of setting up the rank table and not the physical size of the many cylinders in the multiple scattering problem. From Foldy-Lax equations (*Scattering of Electromagnetic Waves, vol. 2: Numerical Simulations;* Wiley Interscience, 2001, L. Tsang, J. A. Kong, K. H. Ding and C. O. Ao), for two equivalent cylinders, r and t, then the interaction matrix has the form.

$$w_m^{(r)} = \text{incidence wave} + \quad (34)$$
$$\sum_{n=-N_c^b}^{N_c^b} H_{(m-n)}^{(1)}(|k(\overline{\rho}_r - \overline{\rho}_t)|)\exp[i(m-n)\phi_{\overline{\rho}_r\overline{\rho}_t}]T_n w_n^{(t)}$$
$$m = -N_c^b, -N_c^b + 1, \Lambda, N_c^b$$

Then the Foldy Lax partial wave impedance matrix $\overline{Z}_b$ is of dimension $(2N_c^b+1)\times(2N_c^b+1)$ and the elements are given by $$(\overline{Z}_b)_{mn} = H_{(m-n)}^{(1)}(|k(\overline{\rho}_r - \overline{\rho}_t)|)\exp[i(m-n)\phi_{\overline{\rho}_r\overline{\rho}_t}]$$
$$\overline{\rho}_t, m,n = -N_c^b, -N_c^b+1, \Lambda, N_c^b \quad (35)$$

We can apply the SVD to determine the rank of $\overline{Z}_b$. This is a fast way because $N_c^b << N$. This has a slightly larger rank because their smallest separation is slightly smaller.

Based on the above techniques, a rank table is given in TABLE IV. The threshold chosen for calculating all rank values is 1.e-5. All methods give essentially the same rank for same physical problem.

Foldy Lax Partial Wave Equation

Figure 9:
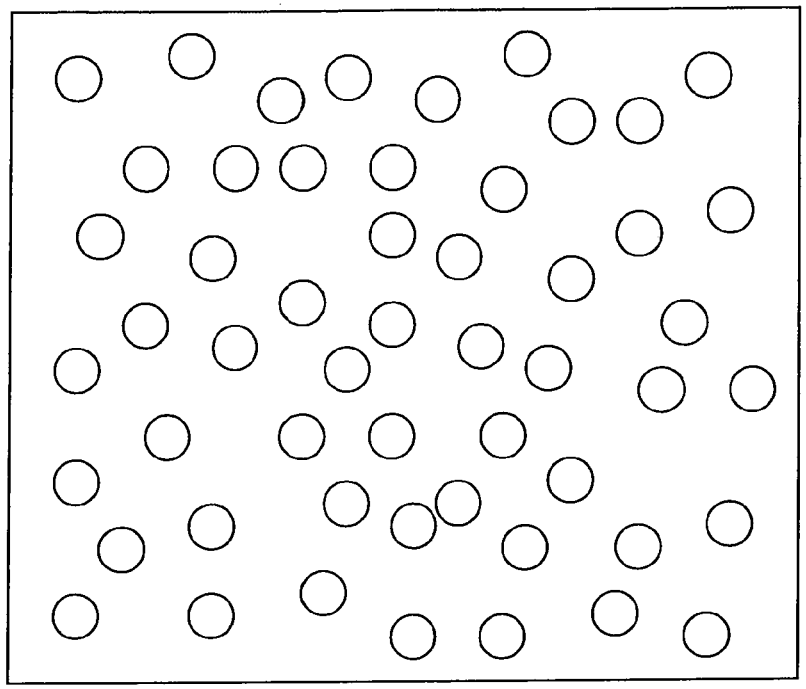
FIG. 9 schematically illustrates distributions of randomly positioned many cylinders located in a square.

FIG. 9 shows $N_p$ cylinders of permittivity $\epsilon_p$ and radius a distributed arbitrarily in a square. Let a plane TM wave incident on them. From equation (9.3.94) of reference (*Scattering of Electromagnetic Waves, vol. 2: Numerical Simulations;* Wiley Interscience, 2001, L. Tsang, J. A. Kong, K. H. Ding and C. O. Ao), the Foldy Lax multiple scattering equation in terms of partial wave expansions is $$c_n^{(N)(q)} = -\exp(i\overline{k}_i \cdot \overline{\rho}_q) \frac{i^n e^{-in\phi_i}}{k} E_{vi} B_n^{(N)} + \quad (36)$$

$$B_n^{(N)} \sum_{n'=-N_c}^{N_c} \sum_{\substack{p=1 \\ p \neq q}}^{N_p} H_{(n-n')}^{(1)}(|k(\overline{\rho}_p - \overline{\rho}_q)|) \exp[-i(n-n')\phi_{\overline{\rho}_p \overline{\rho}_q}] S_{n'}^{(N)} c_{n'}^{(N)(p)}$$

Where $c_n^{(N)(q)}$ is internal field coefficient, $\overline{\rho}_q$ is the position of qth cylinder, $B_n^{(N)}$ is given by equation (9.3.30) in (*Scattering of Electromagnetic Waves, vol. 2: Numerical Simulations;* Wiley Interscience, 2001, L. Tsang, J. A. Kong, K. H. Ding and C. O. Ao).

$$B_n^{(N)} = B_{-n}^{(N)} = -\frac{\frac{2ik}{\pi a k_p}}{k_p H_n^{(1)}(ka)J_n'(k_p a) - k H_n^{(1)'}(ka)J_n(k_p a)} \quad (37)$$

and $S_{n'}^{(N)}$ is given by equation (9.3.95) in (*Scattering of Electromagnetic Waves, vol. 2: Numerical Simulations;* Wiley Interscience, 2001, L. Tsang, J. A. Kong, K. H. Ding and C. O. Ao).

$$S_n^{(N)} = S_{-n}^{(N)} = -\frac{i\pi a k_p}{2k}[k_p J_n(ka)J_n'(k_p a) - k J_n'(ka)J_n(k_p a)] \quad (38)$$

Parameter $k_p$ is wave number inside the particle. Each particle has $N_c$ partial waves. Note that number of $N_c$ is different from $N_c^b$ which is for rank determination for block structure. For each particle, the partial wave is truncated at $N_c = 1.5$ ka.

The Foldy Lax equation is a matrix equation with the dimension of $N = N_p(2N_c+1)$. Each particle has $(2N_c+1)$ coefficients. The impedance matrix for the particle with itself is a $(2N_c+1)$ by $(2N_c+1)$ unit matrix. The impedance matrix for two different particles p and q $\overline{Z}_{pq}$ is of dimension $(2N_c+1)\times(2N_c+1)$ and is given by $-B_n^{(N)} H_{(n-n')}^{(1)}(|k(\overline{\rho}_p-\overline{\rho}_q)|)\exp[-i(n-n')\phi_{\overline{\rho}_p\overline{\rho}_q}] S_{n'}^{(N)}$.

As is clear from the expression, the Foldy lax impedance matrix involves higher order Green's function and not just the usual lowest order Green function of $H_0^{(1)}(|k(\overline{\rho}_p-\overline{\rho}_q)|)$.

Impedance Matrix Compression for Partial waves

Figure 10:
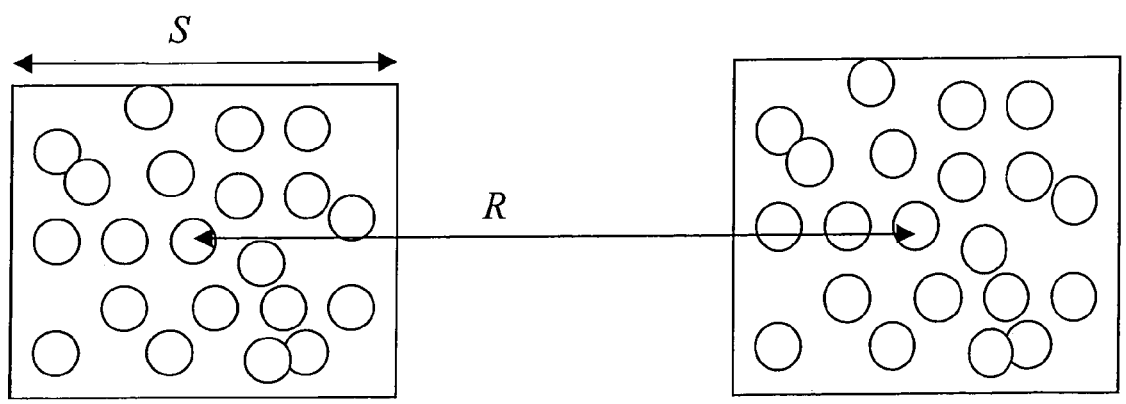
FIG. 10 schematically illustrates two non-near block interactions which include many randomly distributed cylinders.

Suppose that the cylinders are of diameter 1 wavelength and they are densely packed, as indicated in FIG. 9. The $N_c = 0.75(2\pi) = 4$, so that there are 9 partial waves for each particle. Consider two blocks of side S wavelengths, with the distance separated by distance R, as indicated in FIG. 10. The number of cylinders in each block is approximately $S^2$. The dimension of the impedance matrix using partial waves between the two blocks is $S^2(2N_c+1) = 9S^2$.

For example if S=32 wavelengths, then the impedance matrix of the blocks is of dimension $(9)(32*32)=9216$. However, the rank is only 41, as indicated in TABLE IV.

We observe that, (1) If point discretization is used in the volume and assuming 100 volumetric elements per square wavelength over the areas of the cylinders, the dimension of the impedance matrix between the two blocks is 80,425.

(2) Since the particles of the physical problem are of 1 wavelength diameter, using partial wave expansion, the dimension of the impedance matrix between these two blocks is only 9216 which is substantially less than that of volume discretization. This reduction is even more for 3D problems.

(3) Whether volume discretization or partial wave expansion for the 1-wavelength cylinders, the rank is the same and is 41.

(4) Since the use of partial waves reduces the dimension of the matrix, it is advantageous to use partial waves. Thus the Foldy Lax impedance matrix utilizes partial waves (5) It is important to recognize that UV method can directly be applied to the compression of the Foldy Lax partial wave impedance matrix of dimension 9216.

(6) The impedance matrix is of the form of $-B_n^{(N)} H_{(n-n')}^{(1)}(|k(\overline{\rho}_p-\overline{\rho}_q)|)\exp[-i(n-n')\phi_{\overline{\rho}_p\overline{\rho}_q}] S_{n'}^{(N)}$.

Only the factor $H_{n-n'}^{(1)}(|k(\overline{\rho}_p-\overline{\rho}_q)|)\exp[-i(n-n')\phi_{\overline{\rho}_p\overline{\rho}_q}]$ depends on both particles. Thus compression needs only be done for this term. After the compression is done, we can post-multiply by $-B_n^{(N)}$ and pre-multiply by $S_{n'}^{(N)}$.

Bistatic Scattering Coefficients

After the internal field coefficients are determined, the scattered field in direction $\phi_s$ is $$E_s = \sqrt{\frac{2k}{\pi\rho}} \exp[i(k\rho - \pi/4)] \quad (38)$$

$$\sum_{q=1}^{N_p} \sum_{n=-N_c}^{N_c} S_n^{(N)} c_n^q \exp[in(\phi_s - \pi/2)]\exp(-i\overline{k}_s \cdot \overline{\rho}_q)$$

The bistatic scattering coefficient is defined as $$\sigma(\phi_s) = \frac{\rho|E_s|^2}{A} \quad (39)$$

Where A is the area where the cylinders are put in. Thus $$\sigma(\phi_s) = \quad (40)$$

$$\frac{2k}{A\pi} \left| \sum_{q=1}^{N_p} \sum_{n=-N_c}^{N_c} S_n^{(N)} c_n^q \exp[in(\phi_s - \pi/2)]\exp(-i\overline{k}_s \cdot \overline{\rho}_q) \right|^2$$

Multi-Level Partitioning Process

For the physical problem of the cylinders distributed as indicated in FIG. 9, we use the same techniques to do multi-level partitioning as in the case of rough surface scattering of Part I. However, the matrix equation is in terms of partial waves form and there are $(2N_c+1)$ partial waves for each cylinder. If there are $M_r$ cylinders in the receiving group and $M_t$ cylinders in the transmitting groups, then size of interaction matrix is $M_r(2N_c+1)\times M_t(2N_c+1)$.

UV Method

The matrix $\overline{Z}_{m_i n_i}$, which represents the interactions of two non-neighbor groups $m_i$ and $n_i$, can be represented by UV decomposition. The matrix $\overline{Z}_{m_i n_i}$ is of dimensions $4^{(i-1)}M(2N_c+1)$ by $4^{(i-1)}M(2N_c+1)$. The rank of $\overline{Z}_{m_i n_i}$, r, is much smaller than $4^{(i-1)}M(2N_c+1)$. For simpler notation, we denote $\overline{Z}_{m_i n_i}$ by $\overline{A}$, which has dimension of N by N and rank of r with r<<N. To decompose $\overline{A}$ by the SVD and Gram-Schmidt process will be CPU and memory intensive because N is large. Note that in previous section, we apply the SVD to find r. But because of coarse-coarse sampling, the selected matrices are only of dimension roughly of r by r only. To perform UV decomposition, we only need r independent columns of A and r independent rows of A.

Let the column of $\overline{A}$ be denoted by $\overline{a}_l$, where l=1, 2, $\Lambda$, N., where $N=4^{(i-1)}M(2N_c+1)$. Then $A_{mn}=(\overline{a}_n)_m$. The element $A_{mn}$ is the mth element of the column vector $\overline{a}_n$. Note that the columns are the number of cylinders $4^{(i-1)}M$ times the number of partial waves $(2N_c+1)$ in the transmitting region. However there are only r independent columns. In the transmitting region, we select r columns from the N columns. The r elements must be uniformly distributed in the transmitting region. If the rank r is less than the number of cylinders inside transmitting area, we select the zeroth order partial wave of r cylinders uniformly distributed. If the rank r is larger than the number of cylinders $4^{(i-1)}M$, we select the zeroth order harmonics of all the cylinders first, and then select the first order partial wave from the $4^{(i-1)}M$ uniformly distributed cylinders.

We compute the r columns $\overline{u}_l$, l=1, 2, $\Lambda$, r. Each column is of dimension of N and coincides with a column of $\overline{A}$.

$$U_{ml}=(\overline{u}_l)_m=A_{mp(l)},\ m=1,2,\Lambda,N \tag{41}$$

where p(l) is a column index of $\overline{A}$ that depends on l. Note that to get $U_{ml}$, one needs to go through all the N elements in the receiving region. Thus the matrix $\overline{U}$ has Nr elements.

Because of linear independence, any general column $\overline{a}_m$ of $\overline{A}$ is a linear combination of $\overline{u}_l$, that is $$\overline{a}_m = \sum_{l=1}^{r} v_{lm}\overline{u}_l,\ m=1,2,\Lambda,N \tag{42}$$

where $v_{lm}$ are the coefficients to be determined.

We pick r rows of $\overline{A}$, which has total of Nr elements. The r rows correspond to r elements in the receiving group. The criteria for picking up elements is the same as in the transmitting area. We first put these rows in a matrix of $\overline{R}$.

$$R_{m_a p}=A_{m(m_a)p},\ p=1,2,\Lambda,N \text{ and } m_a=1,2,\Lambda,r \tag{43}$$

We pick the $m_a$ rows in $\overline{u}_l$, l=1, 2, ..., r. That will give us r×r matrix and we call it $\hat{U}$ and we have $\hat{U}_{m_a n_a}=(\overline{u}_{n_a})_{m(m_a)}$. Then we set $$R_{m_a l} = \sum_{n_a=1}^{r} \hat{U}_{m_a n_a} v_{n_a l},\ l=1,2,\Lambda,N. \tag{44}$$

In matrix notation, $\overline{V}=r\times N$, $\overline{R}=r\times N$, $\overline{U}=r\times r$, $\overline{R}=\hat{U}\overline{V}$, and $\overline{V}=(\hat{U})^{-1}\overline{R}$. This completes the UV decomposition.

$$\overline{A}=\overline{U}\overline{V} \tag{45}$$

To summarize, we take r columns of $\overline{A}$ and then r rows of N, a total of 2rN elements. We need to take the inverse of an r by r matrix $\hat{U}$ and a matrix multiply of r by r matrix times r by N matrix The computational and memory efficiency is achieved when r<<N.

Computational Complexity Analysis

A. Multi-Level Group Sizes and Number of Groups

The centers of the cylinders are generated in a square area with $\sqrt{N_p}$ points in x direction and $\sqrt{N_p}$ points in y direction. So the total number of cylinders is $N_p$. Note that each cylinder has finite radius of a. We use P level various subgroup sizes to partition the whole area as follows:

1. At Pth level, we split the whole area as 4 groups. Each group has $N_p/4$ cylinders.

$$L_P=4=2^{2(P-P+1)} \tag{46}$$

$$M_P=N_P/4=N_P/L_P \tag{47}$$

Where $L_P$ is number of groups and $M_P$ is number of cylinders of each group at Pth level.

2. Split each group as 4 subgroups and continue this partitioning, at ith level, we have $$L_i=2^{2(P-i+1)} \tag{48}$$

$$M_i=N_p/L_i \tag{49}$$

3. At 1st level, we have $$L_1=2^{2P} \tag{50}$$

$$M_1=N_p/L_1 \tag{51}$$

B. Cost Function at the ith Level

In $\overline{Z}^{(i)}$, we select the interactions between level (i+1) groups and their nearest neighbors. However, some of the interactions have already been included in the lower level groups. They must be excluded at the ith level. There are two kinds of neighboring groups. One is that sharing only one common point and the other is that sharing one common edge.

1). Sharing Only One Common Point

FIG. 4(a) shows two neighboring groups of $m_{(i+1)}$ and $n_{(i+1)}$ sharing only one common point. The impedance matrix that will be calculated is $$\overline{Z}'_{m_{(i+1)} n_{(i+1)}} = \begin{bmatrix} \overline{Z}_{m_i^{(1)} n_i^{(1)}} & \overline{Z}_{m_i^{(1)} n_i^{(2)}} & \overline{Z}_{m_i^{(1)} n_i^{(3)}} & \overline{Z}_{m_i^{(1)} n_i^{(4)}} \\ \overline{Z}_{m_i^{(2)} n_i^{(1)}} & \overline{0}_i & \overline{Z}_{m_i^{(2)} n_i^{(3)}} & \overline{Z}_{m_i^{(2)} n_i^{(4)}} \\ \overline{Z}_{m_i^{(3)} n_i^{(1)}} & \overline{Z}_{m_i^{(3)} n_i^{(2)}} & \overline{Z}_{m_i^{(3)} n_i^{(3)}} & \overline{Z}_{m_i^{(3)} n_i^{(4)}} \\ \overline{Z}_{m_i^{(4)} n_i^{(1)}} & \overline{Z}_{m_i^{(4)} n_i^{(2)}} & \overline{Z}_{m_i^{(4)} n_i^{(3)}} & \overline{Z}_{m_i^{(4)} n_i^{(4)}} \end{bmatrix} \tag{52}$$

The dimension of matrix $\overline{Z}_{m_i n_i}$ is of $M_i(2N_c+1)$ by $M_i(2N_c+1)$. The computational steps for $\overline{Z}_{m_i n_i} \cdot \overline{b}_{M_i}$ through the UV is of $2(2N_c+1)M_i r_i$, where $r_i$ is the rank of $\overline{Z}_{m_i n_i}$. In here we assume the rank $r_i$ of $\overline{Z}_{m_i n_i}$ is same for all block interactions at the same level. There are 15 non-zero matrices of $\overline{Z}_{m_i n_i}$ in the $\overline{Z}'_{m_{(i+1)} n_{(i+1)}}$. The total computational steps for $\overline{Z}'_{m_{(i+1)} n_{(i+1)}} \cdot \overline{b}_{M_{(i+1)}}$ are $30(2N_c+1)M_i r_i$.

2). Sharing One Common Edge

FIG. 4(b) shows two neighboring groups of $m_{(i+1)}$ and $n_{(i+1)}$ sharing one common edge. The impedance matrix that will be calculated is $$\overline{Z}'_{m_{(i+1)}n_{(i+1)}} = \begin{bmatrix} \overline{Z}_{m_i^{(1)}n_i^{(1)}} & \overline{0}_i & \overline{Z}_{m_i^{(1)}n_i^{(3)}} & \overline{0}_i \\ \overline{Z}_{m_i^{(2)}n_i^{(1)}} & \overline{Z}_{m_i^{(2)}n_i^{(2)}} & \overline{Z}_{m_i^{(2)}n_i^{(3)}} & \overline{Z}_{m_i^{(2)}n_i^{(4)}} \\ \overline{Z}_{m_i^{(3)}n_i^{(1)}} & \overline{0}_i & \overline{Z}_{m_i^{(3)}n_i^{(3)}} & \overline{0}_i \\ \overline{Z}_{m_i^{(4)}n_i^{(1)}} & \overline{Z}_{m_i^{(4)}n_i^{(2)}} & \overline{Z}_{m_i^{(4)}n_i^{(3)}} & \overline{Z}_{m_i^{(4)}n_i^{(4)}} \end{bmatrix} \quad (53)$$

There are 12 non-zero matrices of $\overline{Z}_{m_i n_i}$ in the $\overline{Z}'_{m_{(i+1)}n_{(i+1)}}$. The total computational steps for $\overline{Z}'_{m_{(i+1)}n_{(i+1)}} \cdot \overline{b}'_{M_{(i+1)}}$ are $24(2N_c+1)M_i r_i$.

3) Interior groups: interior groups have 8 neighbors. 4 of them share only one common point and 4 of them share one common edge. There are $(L_{(i+1)}^{1/2}-2)^2$ interior groups at (i+1)th level. Thus computational steps for the interior groups at the ith level are $$(L_{(i+1)}^{1/2}-2)^2(4*30(2N_c+1)M_i r_i + 4*24(2N_c+1)M_i r_i) = 216(L_{i+1}^{1/2}-2)^2(2N_c+1)M_i r_i \quad (54)$$

4) Edge groups: edge groups have 5 neighbors. 2 of them share only one common point and 3 of them share one common edge. There are $4(L_{(i+1)}^{1/2}-2)$ edge groups at (i+1)th level. Thus computational steps for the edge groups at the ith level are $$4(L_{(i+1)}^{1/2}-2)(2*30M_i r_i + 3*24M_i r_i)(2N_c+1) = 528(L_{(i+1)}^{1/2}-2)(2N_c+1)M_i r_i \quad (55)$$

5) Corner groups: corner groups have 3 neighbors. One of them shares only one common point and 2 of them share one common edge. There are 4 corner groups at (i+1)th level. Thus computational steps for the corner groups at the ith level are $$4(1*30M_i r_i + 2*24M_i r_i)(2N_c+1) = 312(2N_c+1)M_i r_i \quad (56)$$

6) Total computational steps at ith level are $$216(L_{(i+1)}^{1/2}-2)^2 M_i r_i(2N_c+1) + 528(L_{(i+1)}^{1/2}-2)M_i r_i(2N_c+1) + 312M_i r_i(2N_c+1) = 2M_i r_i(108L_{(i+1)} - 168L_{(i+1)}^{1/2} + 60)(2N_c+1) \quad (57)$$

C. Cost Function for the Multilevel UV method (Non-Near Block Impedance Matrix)

The total computational steps for non-neighbor block interactions, as represented by the block impedance matrix, through the multilevel UV decomposition are then $$\sum_{i=1}^{P-1} 2r_i M_i [108L_{(i+1)} - 168L_{(i+1)}^{1/2} + 60](2N_c+1) \quad (58)$$

Generally, the rank of each level block increases with the increase of block size. For simplicity, we assume $r_i$=constant=r in here and take this r into equation (58), we have $$27rN(2N_c^b+1)\log_2\left(\frac{N}{M_1}\right) + 60rN(2N_c^b+1) - 120rM_1(2N_c+1) \quad (59)$$

D. Cost Function for Near Field Interactions in $\overline{Z}^{(0)}$

All the near field interactions are included in the matrix $\overline{Z}^{(0)}$. The product of $\overline{Z}^{(0)}$ and column vector is computed directly. The block size in $\overline{Z}^{(0)}$ is of dimension of $(2N_c+1)M_1$ by $(2N_c+1)M_1$. The computational steps for the block and block interaction are $(2N_c+1)^2 M_1^2$.

1) Interior group: interior group has 9 blocks (including self-interaction). There are $(L_1^{1/2}-2)^2$ interior groups at the 1st level. Thus computational steps for the interior groups at the 1st level are $9(L_1^{1/2}-2)^2 M_1^2(2N_c+1)^2$.

2) Edge groups: edge group has 6 blocks (including self-interaction). There are $4(L_1^{1/2}-2)$ edge groups at the 1st level. Thus computational steps for the edge groups at the 1st level are $6(L_1^{1/2}-2)M_1^2(2N_c+1)^2$.

3) Corner groups: corner group has 4 blocks (including self). There are 4 corner groups at the 1st level. Thus computational steps for the corner groups at the 1st level are $4M_1^2(2N_c+1)^2$.

4) The total computational steps for near field interaction is then $$9(L_1^{1/2}-2)^2 M_1^2(2N_c+1)^2 + 6(L_1^{1/2}-2)M_1^2(2N_c+1)^2 + 4M_1^2(2N_c+1)^2 = (9NM_1 - 12N^{1/2}M_1^{3/2} + 4M_1^2)(2N_c+1)^2 \quad (60)$$

E. Cost Function

The total computational steps for multi-level partitioning UV is sum of the near and non-near block interactions and is given by $$\left\{27rN\log_2\left(\frac{N}{M_1}\right) + 60rN - 120rM_1\right\}(2N_c+1) + (9NM_1 - 12N^{1/2}M_1^{3/2} + 4M_1^2)(2N_c+1)^2 \quad (61)$$

Numerical Results and Discussion

The numerical simulation results are presented and compared in terms of the matrix vector product and solutions of the Foldy Lax equation with an iterative solver. Simulations are based on the periodic distributions of many cylinders and the random distribution of many cylinders. We assume all the cylinders have the same diameter and its value is 1 wavelength. The horizontal and vertical separations between the centers of two neighboring cylinders are taken as 1.3 wavelengths for periodic distribution. For the case of random distribution, each center of the cylinders is moved randomly within the range of −0.15 wavelengths to 0.15 wavelengths in both horizontal and vertical directions. The relative dielectric constant of all the cylinders is 3.2 in FIG. 12 and is equal to 1.5 in FIG. 13. The computer used in the simulations is a single Pentium processor of 2.6 GHz with 2 Gb memory. First, we illustrate the rank determination for the problem.

A. Rank Determination for Foldy Lax Equation:

The cylinders are first grouped with the multi-level partitioning process. Based on the coarse-coarse boundary sampling, we can calculate the ranks of interaction groups with the SVD method. We actually use a little bit higher rank than the calculated when constructing the UV matrix.

B. CPU for the UV

TABLE V lists the CPU time based on the UV method for different number of cylinders. The diameter of each cylinder is 1 wavelength and the number of partial waves is 9. That means there are 9 partial waves unknowns to be determined for each cylinder. The numbers of cylinders are 64, 256, 1024, and 4096. The preprocessing time of the UV method is time used to construct U and V matrix and also the time for rank determination. The CPU time for matrix-vector multiplication means the CPU time spent for one matrix vector multiplication. For the case of 4,096 cylinders, which corresponds to 36,864 partial waves unknowns, it takes less than 7.34 seconds for the matrix vector multiplication. This case corresponds to 321,700 equivalent number of volumetric unknowns if point discretisation is used for the volume of each cylinder.

C. Comparisons of the Matrix Vector Product

Figure 11:
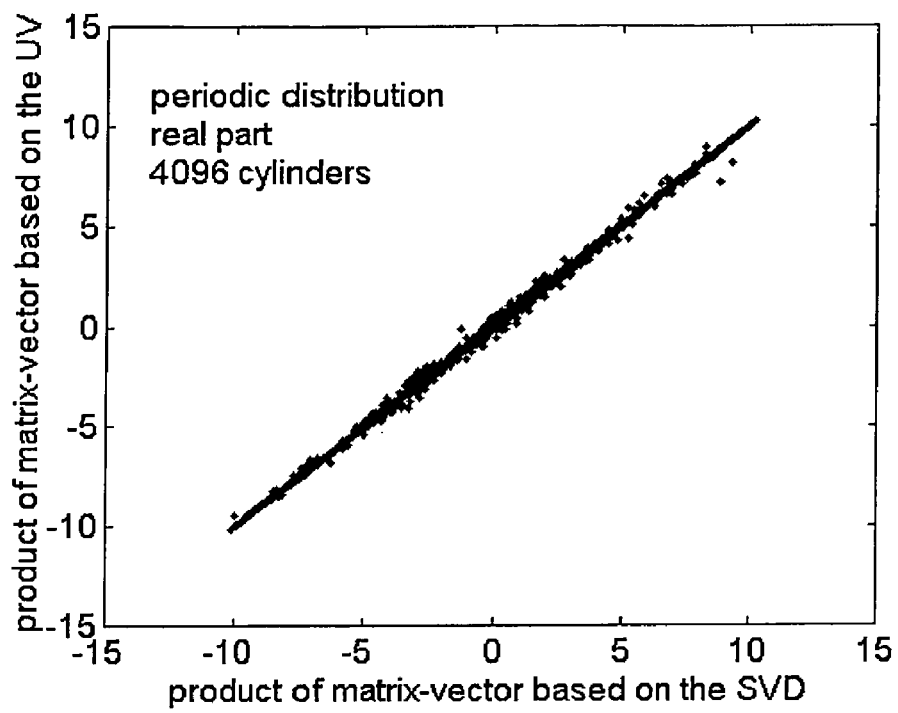
FIG. 11 is a graphical representation of matrix vector product, comparing the product of the embodiment with the SVD-based QR method
Figure 11:
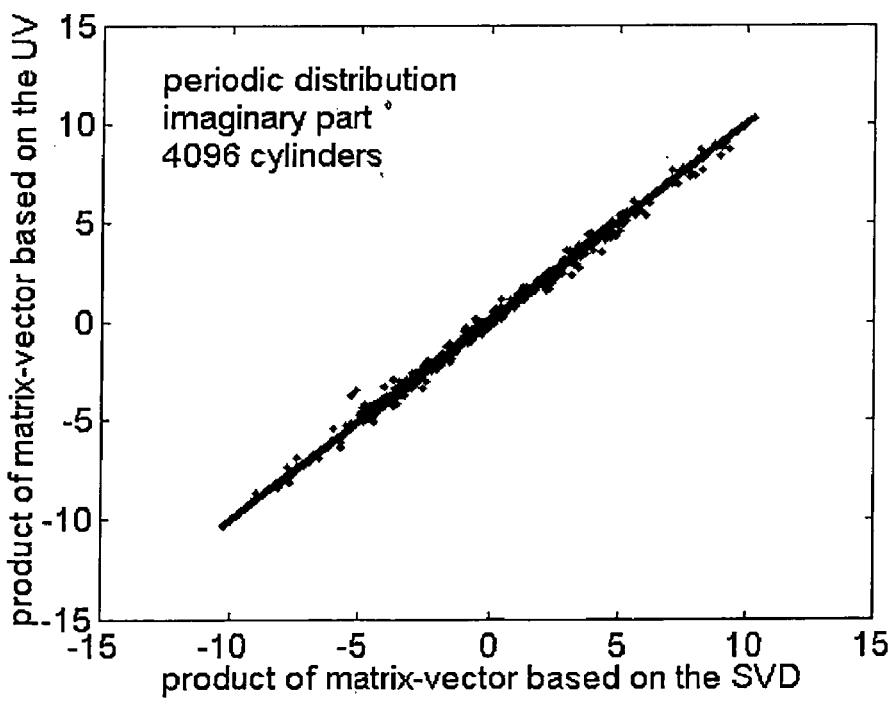

FIG. 11 illustrates results for 4,096 cylinders. Due to the limited computer resource, the direct multiplication is not possible for this case. Thus we make comparison between the SVD based QR method and the UV method. We use the product from the SVD method as the horizontal values and the product from the UV method as the vertical values. FIG. 11(a) is for real part and FIG. 11(b) is for imaginary part. We can see all the points are along 1:1 line and that means the products from both methods are in excellent agreement. We also list the relative norm errors for the matrix-vector product comparing with direct matrix-vector multiplication for all the cases above, as indicated in TABLE V. The error inside bracket for 1,024 cylinders is for random distribution. It can be seen that the errors are very small.

D. Comparisons of the Solutions of Foldy Lax Equation for Different Number of Cylinders Using the proposed UV method, we have solved the Foldy Lax equation with an iterative solver for random distributed cylinders. The relative dielectric constant of all the cylinders is 1.5 and the convergent condition for the iterative approach is set at 1.e-3.

TABLE VI lists the CPU time and relative norm errors for each solution. We also show the number of CG iterations and CPU time for the rank determination. The CPU time for rank determination is included in the column of preprocessing and is the values inside bracket. The number of iterations is put in the column of CG and is the number inside the bracket. The total CPU for 64 cylinders is 3 seconds and is 36 seconds for 256 cylinders. For 1,024 cylinders, preprocessing time is 121 seconds and it takes only 32 seconds for rank determination based on the coarse-coarse sampling. The CPU for iteration method is 711 seconds. A total of 330 iterations are needed to reach the convergence. The relative errors are 0.0014 for 64 cylinders, 0.0078 for 256 cylinders, and 0.0189 for 1,024 cylinders. Thus using the UV method, the product of matrix and column vector can be done efficiently and accurately. However, the number of CG iterations grows with the number of cylinders. This property of the Foldy-Lax partial wave equation needs to be investigated.

E. Bistatic Scattering Coefficients for Different Number of Cylinders

Figure 12:
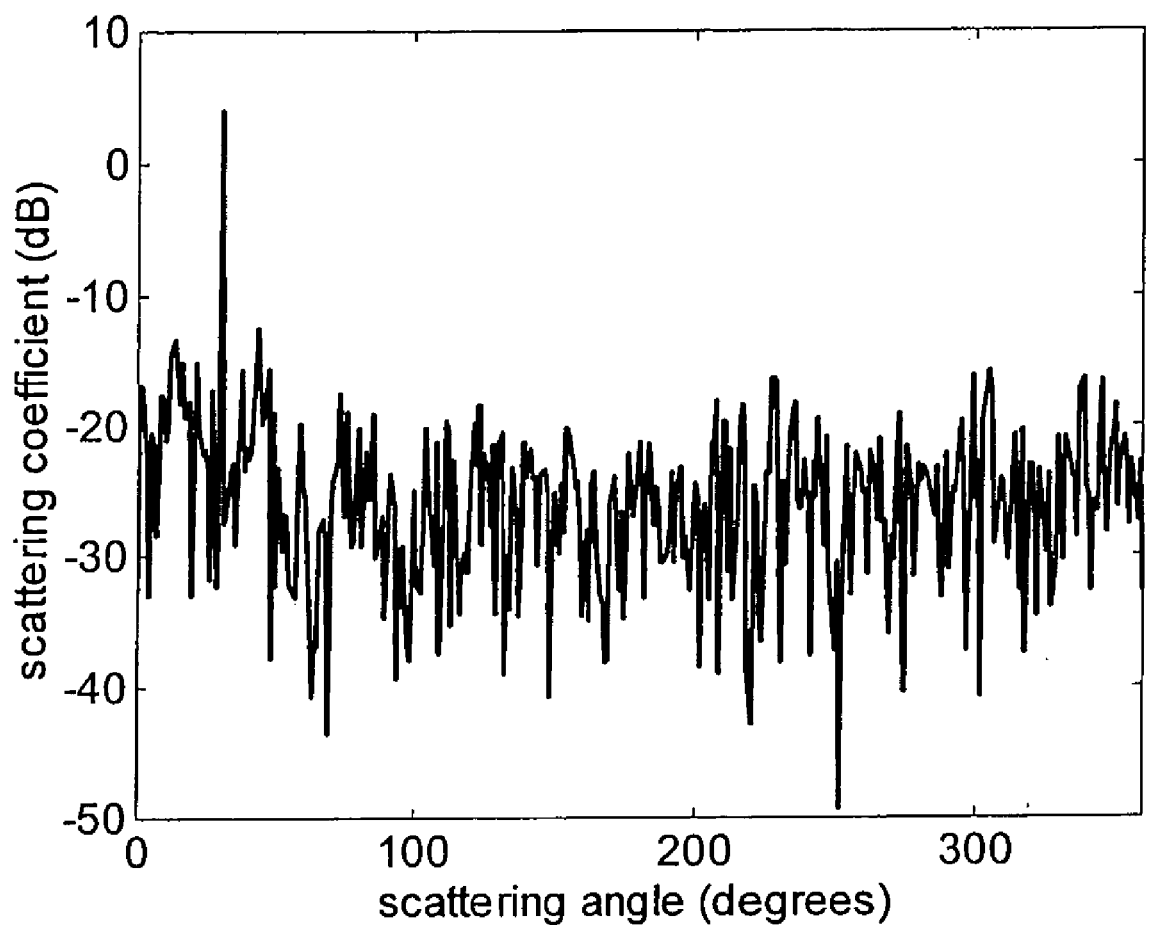
FIG. 12 is a graphical representation of bistatic scattering coefficients versus scattering angles.

After the solutions of the Foldy Lax equation, we can calculate the bistatic scattering coefficients. FIG. 12 shows the scattering coefficients for number of cylinders of 1,024. The incident angle is 30 degrees. The diameter of all cylinders is 1.0 wavelength and relative permittivity is 1.5. The cylinders are randomly distributed.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

TABLE I (a)

Rank Table of two areas with zero vertical separation

| $L_x = L_y$ ($\lambda$) | Points in block | Distance ($\lambda$) | Rank — Area Sampling (100 points per square wavelength) | Rank — Boundary (line) dense sampling (10 points per wavelength) | Rank — Boundary (line) coarse sampling (4 points per wavelength) |
|---|---|---|---|---|---|
| 1.0 | 100 | 2.00 | 14 | 13 | 12 |
| 1.0 | 100 | 2.23 | 13 | 13 | 12 |
| 1.0 | 100 | 2.83 | 11 | 9 | 9 |
| 1.0 | 100 | 3.60 | 9 | 9 | 8 |
| 1.0 | 100 | 4.24 | 9 | 8 | 8 |
| 2.0 | 400 | 4.00 | 17 | 15 | 15 |
| 2.0 | 400 | 4.47 | 15 | 14 | 14 |
| 2.0 | 400 | 5.65 | 13 | 12 | 12 |
| 2.0 | 400 | 7.21 | 11 | 11 | 11 |
| 2.0 | 400 | 8.48 | 9 | 10 | 10 |
| 4.0 | 1,600 | 8.00 | 23 | 29 | 20 |
| 4.0 | 1,600 | 8.94 | 21 | 18 | 18 |
| 4.0 | 1,600 | 11.3 | 17 | 16 | 16 |
| 4.0 | 1,600 | 14.4 | 14 | 13 | 13 |
| 4.0 | 1,600 | 17.0 | 11 | 12 | 12 |

TABLE I (b)

Rank Table of Two Volumes

| $L_x = L_y$ ($\lambda$) | Points in block | Distance ($\lambda$) | $L_z$ ($\lambda$) | Rank — Volume sampling (1000 points per cubic wavelength) | Rank — Boundary (surface) dense sampling (100 points per square wavelength) | Rank — Boundary (surface) coarse sampling (16 points per square wavelength) |
|---|---|---|---|---|---|---|
| 1.0 | 600 | 2.00 | 0.6 | 30 | 34 | 32 |
| 1.0 | 800 | 2.00 | 0.8 | 35 | 37 | 36 |
| 1.0 | 1,000 | 2.00 | 1.0 | 38 | 43 | 41 |

TABLE I (b)-continued

Rank Table of Two Volumes

| $L_x = L_y$ ($\lambda$) | Points in block | Distance ($\lambda$) | $L_z$ ($\lambda$) | Volume sampling (1000 points per cubic wavelength) | Boundary (surface) dense sampling (100 points per square wavelength) | Boundary (surface) coarse sampling (16 points per square wavelength) |
|---|---|---|---|---|---|---|
| 2.0 | 3,200 | 4.00 | 0.8 | 37 | 41 | 41 |
| 2.0 | 4,800 | 4.00 | 1.2 | NA | 49 | 50 |
| 2.0 | 8,000 | 4.00 | 2.0 | NA | 65 | 67 |
| 4.0 | 12,800 | 8.00 | 0.8 | NA | 49 | 49 |
| 4.0 | 38,400 | 8.00 | 2.4 | NA | NA | 81 |
| 4.0 | 64,000 | 8.00 | 4.0 | NA | NA | 116 |

TABLE II

Rank Table of Rough Surface*

| $L_x = L_y$ ($\lambda$) | Points in square | Distance ($\lambda$) | $L_z$ ($\lambda$) | Rank |
|---|---|---|---|---|
| 1.0 | 64 | 2.00 | 1.402 | 15 |
| 2.0 | 256 | 4.00 | 1.824 | 29 |
| 4.0 | 1,024 | 8.00 | 3.219 | 44 |

*From one realization of rough surfaces with rms height of 0.5 wavelength and correlation length of 0.707 wavelength. Surface area is 16 by 16 square wavelength and 64 points per square wavelength are used in generating the rough surface. For rank determination, 16 points per square wavelength are taken uniformly from the rough surfaces.

TABLE III

CPU for the UV method of Rough Surface

| # of unknowns | Preprocessing (s) | CG (s) | Per iteration (s) | Total CPU (s) |
|---|---|---|---|---|
| 4,096 | $6^1 + 5^2$ | 14 | 0.7 | 25 |
| 16,384 | 291 + 54 | 170 | 5.48 | 515 |
| 65,536 | 291 + 500 | 1,220 | 35.88 | 2,011 |

[1] CPU for rank determination with coarse—coarse sampling.
[2] CPU for building UV matrix.

TABLE IV

Rank Table of Volume Scattering of Partial Waves

| $L_x = L_y$ ($\lambda$) | Points in block | Distance ($\lambda$) | Area sampling (100 points per square wavelength) | Boundary (line) dense sampling (10 points per wavelength) | Boundary (line) coarse sampling (4 points per wavelength) | Cylindrical wave expansion |
|---|---|---|---|---|---|---|
| 1.0 | 100 | 2.00 | 9 | 9 | 9 | 8 |
| 1.0 | 100 | 2.23 | 8 | 9 | 9 | NA |
| 1.0 | 100 | 2.83 | 7 | 7 | 7 | NA |
| 1.0 | 100 | 3.60 | 6 | 7 | 7 | NA |
| 1.0 | 100 | 4.24 | 6 | 6 | 6 | NA |
| 2.0 | 400 | 4.00 | 10 | 11 | 11 | 11 |
| 2.0 | 400 | 4.47 | 9 | 10 | 10 | NA |
| 2.0 | 400 | 5.65 | 8 | 8 | 9 | NA |
| 2.0 | 400 | 7.21 | 7 | 8 | 8 | NA |
| 2.0 | 400 | 8.48 | 7 | 7 | 7 | NA |
| 4.0 | 1,600 | 8.00 | 12 | 13 | 13 | 15 |
| 4.0 | 1,600 | 8.94 | 11 | 12 | 12 | NA |
| 4.0 | 1,600 | 11.3 | 10 | 11 | 11 | NA |
| 4.0 | 1,600 | 14.4 | 9 | 9 | 9 | NA |
| 4.0 | 1,600 | 17.0 | 8 | 9 | 9 | NA |
| 8.0 | 6,400 | 16.0 | NA | 18 | 18 | 23 |
| 16.0 | 25,600 | 32.0 | NA | 26 | 26 | 37 |
| 32.0 | 102,400 | 64.0 | NA | 41 | 41 | 63 |

TABLE V

CPU for the UV method and Norm Error of Partial Wave Equations

| # of cylinders | Preprocessing (s) | Matrix-vector (s) | Norm error |
|---|---|---|---|
| 64 | 1 | 0.02 | 0.0033 |
| 256 | 14 | 0.13 | 0.0020 |
| 1,024 | 115 | 1.03 | 0.0015 (0.0017) |
| 4,096 | 999 | 7.34 | 0.0127 |

TABLE VI

CPU for the UV-CG method and Norm Error for Partial Wave Equations

| # of cylinders | Preprocessing (s) | CG (s) | Total CPU (s) | Norm error |
|---|---|---|---|---|
| 64 | 2 (<1*) | 1 (21**) | 3 | 0.0014 |
| 256 | 15 (4) | 21 (75) | 36 | 0.0078 |
| 1,024 | 121 (32) | 711 (330) | 832 | 0.0189 |

*CPU time for rank determination
**Number of iterations for CG method

We claim:

1. A computer-implemented method for solving integral equations representing wave propagation within a region, the method including:
    (i) representing an integral equation describing wave propagation as a matrix equation including an impedance matrix and an unknown column vector;
    (ii) partitioning the impedance matrix on a plurality of levels as a structure of block impedance matrices, each block impedance matrix representing the interaction of two blocks of the grid;
    (iii) for each pair of blocks, each of size b×b, decomposing each block impedance matrix having a rank r as a product UV of two matrices U and V, where U has a size r times b and V has a size b times r;
    (iv) solving the matrix equation using an iterative method having a number of steps in each of which a column vector is multiplied by V and the result multiplied by U; and
    (v) using the matrix equation solution to determine equivalent circuit parameters.

2. A method according to claim 1 in which the impedance matrix is defined between points on a grid defined in the region.

3. A method according to claim 1 in which the impedance matrix is defined between coefficients of wave expansions for objects defined in the region.

4. A method according to claim 1 in which the matrix equation is for solving Maxwell's equation expressed as a surface integral equation, the method including the steps of forming the matrix equation by
    (a) constructing the surface integral equation with Green's function;
    (b) using basis functions and testing functions to transforming the surface integral equation into the matrix equation.

5. A method according to claim 4 in which the sampling is performed using boundary sampling.

6. A method according to claim 4 in which the wave equation relates to scattering of a wave and the sampling is performed using coarse-coarse sampling.

7. A method according to claim 1 in which the matrix equation is for solving Foldy Lax equations of partial waves, the method including the steps of forming the matrix equation by:
    (a) building a Foldy Lax multiple scattering equation of partial waves for volume scattering;
    (b) transforming the Foldy Lax volume integral equation into the matrix equation.

8. A method according to claim 1, further including calculating the rank of at least one of the block impedance matrices by sampling using coarse sampling from the blocks and forming a matrix of the impedance values between the sampled points, and obtaining the rank by performing an SVD process on the matrix.

9. A method according to claim 1 including determining the rank of the block impedance matrices and setting up rank tables by
    (a) deriving equivalent circular areas for each of the two blocks;
    (b) performing a cylindrical wave expansion of an equation representing the interaction of the circular areas; and
    (c) using an SVD method to determine the rank based on the cylindrical wave expansion.

10. A method according to claim 1 in which the rank of the block impedance matrices of a given problem is extracted from a rank table or from coarse-coarse sampling.

11. A method according to claim 1 in which the wave propagation is in a region including a printed circuit board (PCB).

12. A method according to claim 1 in which the wave propagation is in a region including an integrated circuit (IC) packaging structure.

13. A method according to claim 1 in which the wave propagation is in a region including an interconnect structure.

14. A method according to claim 1 in which the wave propagation is in a region including on-chip structure.

15. A method according to claim 1 in which the wave propagation is in a region including a patch antenna.

16. A method according to claim 1 in which the wave propagation is in a region including a micro-strip antenna.

17. A computer-implemented method for solving integral equations representing wave propagation within a region, the method including:
    (i) building a Foldy Lax multiple scattering equation of partial waves for volume scattering;
    (ii) transforming the Foldy Lax volume integral equation into a matrix equation including an impedance matrix and an unknown column vector;
    (iii) partitioning the impedance matrix on a plurality of levels as a structure of block impedance matrices, each block impedance matrix representing the interaction of two blocks of the grid;
    (iv) for each pair of blocks, each of size b×b, decomposing each block impedance matrix having a rank r as a product UV of two matrices U and V, where U has a size r times b and V has a size b times r;
    (v) solving the matrix equation using an iterative method having a number of steps in each of which a column vector is multiplied by V and the result multiplied by U; and
    (vi) using the matrix equation solution to analyze nanostructures.

18. A method according to claim 17 in which the wave propagation is in a region in a nano-material.

19. A method according to claim 17 in which the wave propagation is wave propagation in a region in a metamaterial.

20. A method according to claim 17 in which the wave propagation is in a region in a photonic bandgap structure.

21. A method according to claim 17 in which the wave propagation is wave propagation in a region including a scattering medium consisting of randomly distributed scatterers.

22. A method according to claim 17 in which the step of solving the matrix equation includes obtaining a radar cross section of scattering objects in the region.

23. A method according to claim 17 in which the matrix equation solution comprises an equivalent circuit.

24. The method of claim 23, further comprising analyzing the equivalent circuit parameters with a circuit analysis program.

25. A method according to claim 17 in which after solving the matrix equation, the output is a scattering matrix.

26. A computer apparatus for solving equations representing wave propagation within a region, the apparatus including a processor arranged to perform the steps of:
   (i) representing an integral equation describing wave propagation as a matrix equation including an impedance matrix and an unknown column vector;
   (ii) partitioning the impedance matrix on a plurality of levels as a structure of block impedance matrices, each block impedance matrix representing the interaction of two blocks of the grid;
   (iii) for each pair of blocks, each of size b×b, decomposing each block impedance matrix having a rank r as a product UV of two matrices U and V, where U has a size r times b and V has a size b times r;
   (iv) solving the matrix equation based on using iterative method having a number of steps in each of which a column vector is multiplied by the V and the result multiplied by U; and
   (v) using the matrix equation solution to determine equivalent circuit parameters.

27. A computer-readable medium carrying computer program instructions which, when executed by a processor of the computer, cause the processor to solve equations representing wave propagation within a region by performing the steps of:
   (i) obtaining a matrix equation of the column vector based on an impedance matrix derived from integral equation describing the wave propagation;
   (ii) partitioning the impedance matrix on a plurality of levels as a structure of block impedance matrices, each block impedance matrix representing the interaction of two blocks of the grid;
   (iii) for each pair of blocks, each of size b×b, decomposing each block impedance matrix having a rank r as a product UV of two matrices U and V, where U has a size r times b and V has a size b times r;
   (iv) solving the matrix equation based on using iterative method having a number of steps in each of which a column vector is multiplied by V and the result multiplied by U; and
   (v) using the matrix equation solution to determine equivalent circuit parameters.

28. The medium of claim 27 for use in analyzing at least one of: an electronic package structures, an integrated circuit package, a printed circuit board, interconnects, an on-chip structure, a patch antenna, a micro-strip antenna, or a rough surface structure.

29. The medium of claim 27 wherein the computer program instructions further cause the processor to determine an equivalent circuit for the electronic package, printed circuit board, IC packaging, and on-chip structure.

30. The medium of claim 27, wherein the computer program instructions, when executed by the processor, further cause the processor to compute field solutions and use the field solutions to generate an equivalent circuit and analyze the equivalent circuit with a circuit analysis program.

31. The medium of claim 27, wherein the computer program instructions, when executed by the processor, cause the processor to compute field solutions and use the field solutions to output a scattering matrix.

32. The medium of claim 31, wherein the computer program instructions, when executed by the processor, cause the processor to compute field equations and use the field solutions to generate an output scattering matrix as input into a microwave network model for analysis of the electronic package.

33. The medium of claim 27 which is for use in determining and analyzing the properties of nano materials, metamaterials, photonic bandgap structures, electronic scattering from nanostructures, electronic bandstructures of nanomaterials, and random media structures.

* * * * *